US012632891B2

(12) United States Patent
Vashishtha et al.

(10) Patent No.: US 12,632,891 B2
(45) Date of Patent: May 19, 2026

(54) SYSTEM AND METHOD FOR PROVIDING PERSONALIZED ITEM RECOMMENDATIONS WITH PERSONALIZED TITLE

(71) Applicant: Walmart Apollo, LLC, Bentonville, AR (US)

(72) Inventors: Shanu Vashishtha, San Francisco, CA (US); Abhay Kumar, Sunnyvale, CA (US); Lalitesh Morishetti, San Jose, CA (US); Kaushiki Nag, Sunnyvale, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 115 days.

(21) Appl. No.: 18/422,382

(22) Filed: Jan. 25, 2024

(65) Prior Publication Data

US 2024/0257214 A1    Aug. 1, 2024

Related U.S. Application Data

(60) Provisional application No. 63/442,265, filed on Jan. 31, 2023.

(51) Int. Cl.
*G06Q 30/0601*          (2023.01)
(52) U.S. Cl.
CPC .................................. *G06Q 30/0631* (2013.01)
(58) Field of Classification Search
None
See application file for complete search history.

(56) References Cited

U.S. PATENT DOCUMENTS

| | | |
|---|---|---|
| 11,170,430 B1 | 11/2021 | Richards |
| 2018/0101893 A1* | 4/2018 | Dagan ................ G06Q 30/0641 |
| 2018/0247363 A1* | 8/2018 | Agarwal ........... G06Q 30/0629 |
| 2019/0114040 A1* | 4/2019 | Roberts ................. G06F 16/951 |
| 2021/0233124 A1 | 7/2021 | Rahman et al. |
| 2021/0233151 A1* | 7/2021 | Rahman ............. G06Q 30/0629 |

(Continued)

OTHER PUBLICATIONS

L. Li et al., "Complementary Recommendation in E-commerce: Definition, Approaches, and Future Directions," https://arxiv.org/abs/2403.16135, Mar. 24, 2024, 20 pages.

*Primary Examiner* — Kito R Robinson
(74) *Attorney, Agent, or Firm* — Morgan, Lewis & Bockius LLP; Manita Rawat

(57) ABSTRACT

Systems and methods for providing personalized item recommendations with personalized title are disclosed. In some embodiments, each user and each item of a website is represented as an embedding in a same heterogeneous graph. Based on an anchor embedding representing an anchor item in the heterogeneous graph, a set of items are determined. At least one feature aspect is selected from a set of feature aspects based on at least one implicit intent of a user, each feature aspect characterizing a respective aspect of features common to the set of items. From the set of items, a ranked list of items are generated as recommended items based on the at least one feature aspect. A recommendation title describing the at least one feature aspect is generated for the recommended items. The recommended items and the recommendation title are transmitted to be displayed together with the anchor item to the user.

20 Claims, 14 Drawing Sheets

(56) References Cited

U.S. PATENT DOCUMENTS

| | | | |
|---|---|---|---|
| 2021/0406993 A1* | 12/2021 | Sethi | G06N 3/044 |
| 2024/0046075 A1* | 2/2024 | Chen | G06N 3/084 |
| 2024/0257214 A1 | 8/2024 | Vashishtha et al. | |

* cited by examiner

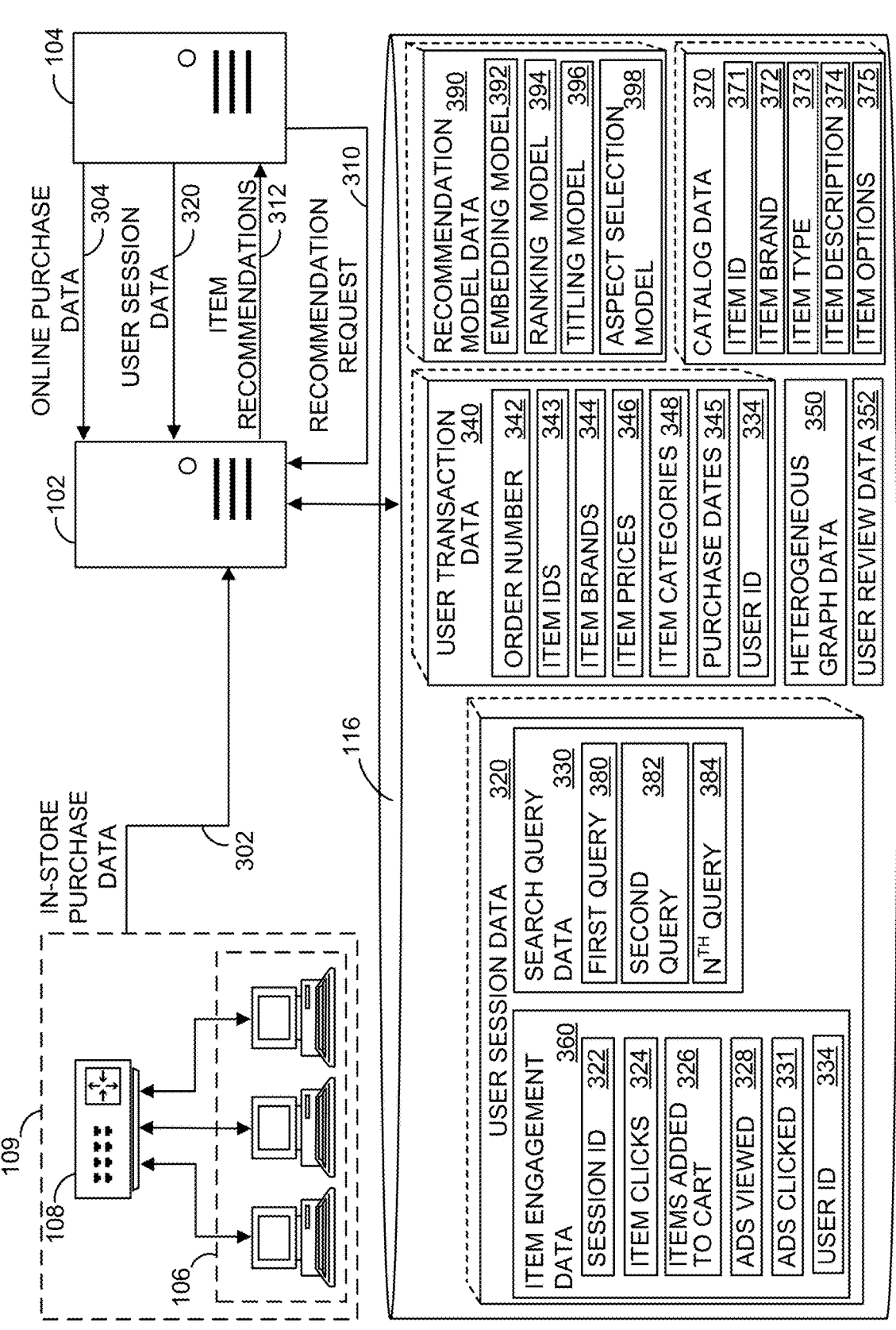

ONLINE PURCHASE DATA 304

USER SESSION DATA 320

ITEM RECOMMENDATIONS 312

RECOMMENDATION REQUEST 310

IN-STORE PURCHASE DATA 302

RECOMMENDATION MODEL DATA 390
EMBEDDING MODEL 392
RANKING MODEL 394
TITLING MODEL 396
ASPECT SELECTION MODEL 398

CATALOG DATA 370
ITEM ID 371
ITEM BRAND 372
ITEM TYPE 373
ITEM DESCRIPTION 374
ITEM OPTIONS 375

USER TRANSACTION DATA 340
ORDER NUMBER 342
ITEM IDS 343
ITEM BRANDS 344
ITEM PRICES 346
ITEM CATEGORIES 348
PURCHASE DATES 345
USER ID 334
HETEROGENEOUS GRAPH DATA 350
USER REVIEW DATA 352

USER SESSION DATA 320
SEARCH QUERY DATA 330
FIRST QUERY 380
SECOND QUERY 382
NTH QUERY 384

ITEM ENGAGEMENT DATA 360
SESSION ID 322
ITEM CLICKS 324
ITEMS ADDED TO CART 326
ADS VIEWED 328
ADS CLICKED 331
USER ID 334

FIG. 3

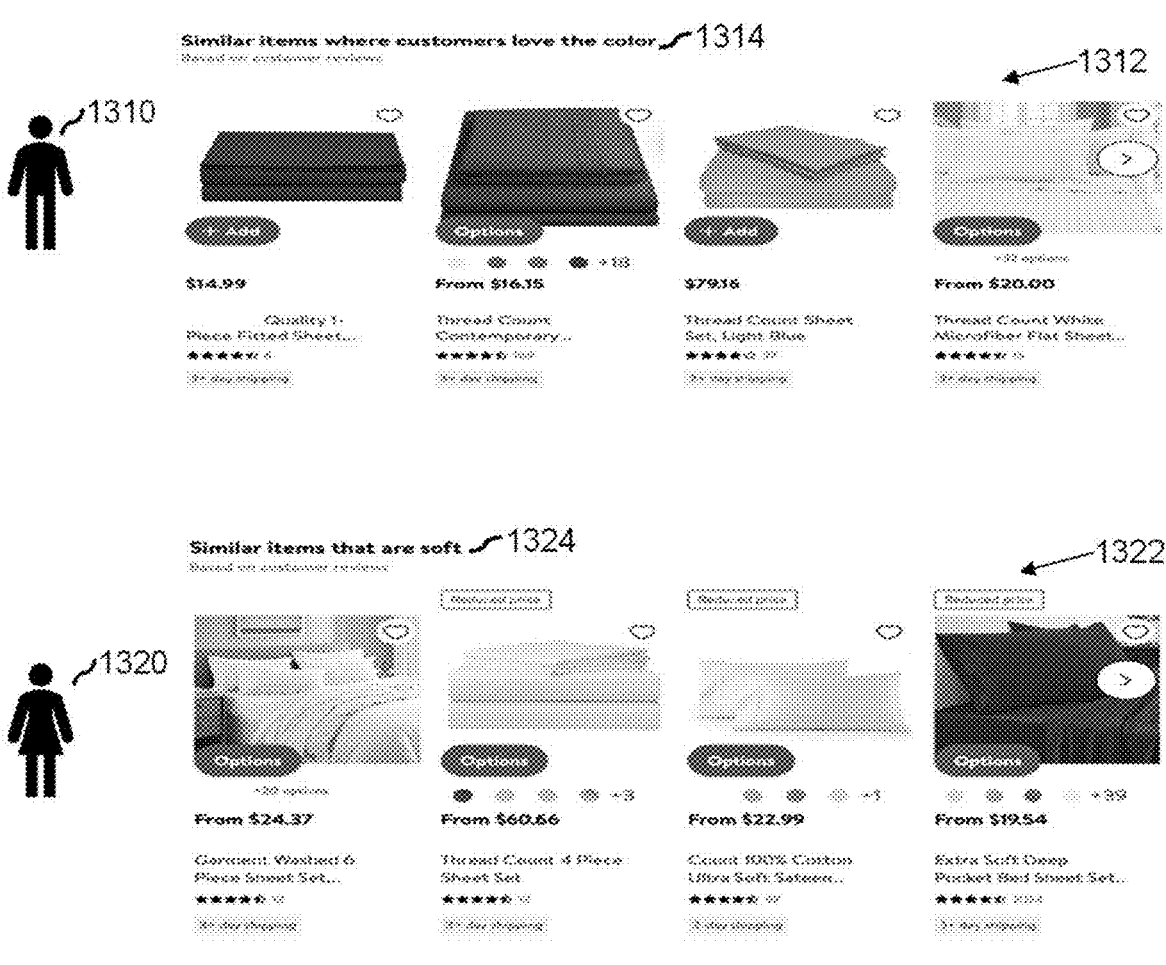
FIG. 13

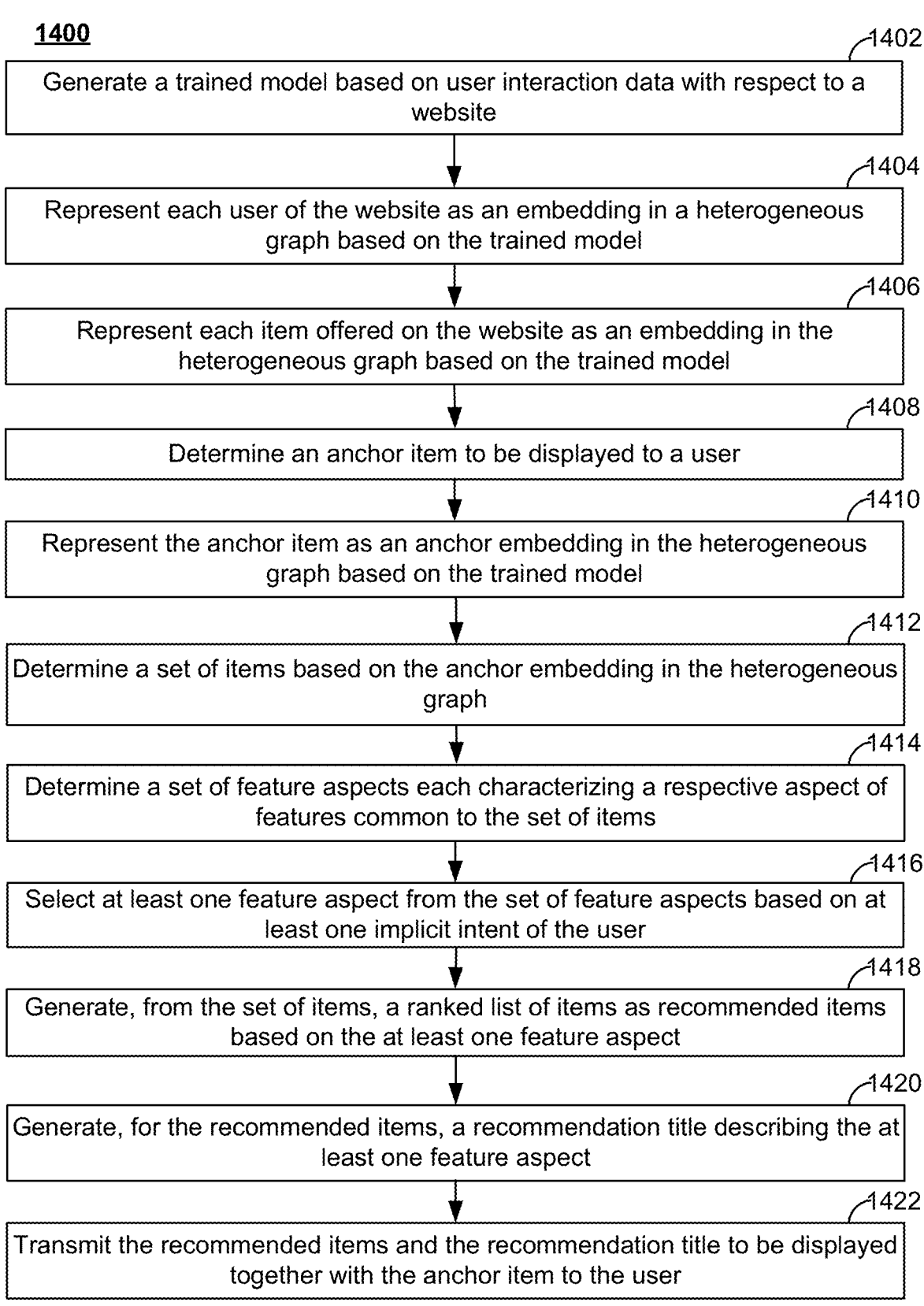

1400                                                                1402

Generate a trained model based on user interaction data with respect to a website

1404

Represent each user of the website as an embedding in a heterogeneous graph based on the trained model

1406

Represent each item offered on the website as an embedding in the heterogeneous graph based on the trained model

1408

Determine an anchor item to be displayed to a user

1410

Represent the anchor item as an anchor embedding in the heterogeneous graph based on the trained model

1412

Determine a set of items based on the anchor embedding in the heterogeneous graph

1414

Determine a set of feature aspects each characterizing a respective aspect of features common to the set of items

1416

Select at least one feature aspect from the set of feature aspects based on at least one implicit intent of the user

1418

Generate, from the set of items, a ranked list of items as recommended items based on the at least one feature aspect

1420

Generate, for the recommended items, a recommendation title describing the at least one feature aspect

1422

Transmit the recommended items and the recommendation title to be displayed together with the anchor item to the user

FIG. 14

SYSTEM AND METHOD FOR PROVIDING PERSONALIZED ITEM RECOMMENDATIONS WITH PERSONALIZED TITLE

CROSS-REFERENCE TO RELATED APPLICATION

This application claims benefit to U.S. Provisional Application Ser. No. 63/442,265, entitled "SYSTEM AND METHOD FOR PROVIDING PERSONALIZED ITEM RECOMMENDATIONS WITH PERSONALIZED TITLE," filed on Jan. 31, 2023, the disclosure of which is incorporated herein by reference in its entirety.

TECHNICAL FIELD

This application relates generally to item recommendations and, more particularly, to systems and methods for providing personalized item recommendations with a personalized title to a user.

BACKGROUND

Item recommendation tasks in e-commerce industry are essential to improve user experiences by recommending items to users. For example, a website may display item recommendations, and may further allow a customer to purchase recommended items. Some existing recommendation systems provide item recommendations to a user based on a search query submitted by the user. But the search query may not reflect all intent of the user. Some existing recommendation systems provide item recommendations to a user based on an anchor item and historical transaction data of other users with respect to this anchor item. But these item recommendations are not based on personal preference of the user, as different users may prefer and/or purchase a same item because of different reasons.

As a result, a retailer may lose sales of items to a customer. For example, the customer may not buy the recommended item. In addition, the customer may leave the website without having purchased an item that, if shown a recommendation for, the customer would have purchased. In some examples, if a customer perceives a recommendation as irrelevant or embarrassing, the customer may go elsewhere, such as another website, to make purchases. As such, there are opportunities to address and improve item recommendation systems.

SUMMARY

The embodiments described herein are directed to systems and methods for providing personalized item recommendations with a personalized title to a user.

In various embodiments, a system including a non-transitory memory configured to store instructions thereon and at least one processor is disclosed. The at least one processor is configured to read the instructions to: generate a trained model based on user interaction data with respect to a website; represent each user of the website as an embedding in a heterogeneous graph based on the trained model; represent each item offered on the website as an embedding in the heterogeneous graph based on the trained model; determine an anchor item to be displayed to a user; represent the anchor item as an anchor embedding in the heterogeneous graph based on the trained model; determine a set of items based on the anchor embedding in the heterogeneous graph; determine a set of feature aspects each characterizing a respective aspect of features common to the set of items; select at least one feature aspect from the set of feature aspects based on at least one implicit intent of the user; generate, from the set of items, a ranked list of items as recommended items based on the at least one feature aspect; generate, for the recommended items, a recommendation title describing the at least one feature aspect; and transmit the recommended items and the recommendation title to be displayed together with the anchor item to the user.

In various embodiments, a computer-implemented method is disclosed. The computer-implemented method includes: generating a trained model based on user interaction data with respect to a website; representing each user of the website as an embedding in a heterogeneous graph based on the trained model; representing each item offered on the website as an embedding in the heterogeneous graph based on the trained model; determining an anchor item to be displayed to a user; representing the anchor item as an anchor embedding in the heterogeneous graph based on the trained model; determining a set of items based on the anchor embedding in the heterogeneous graph; determining a set of feature aspects each characterizing a respective aspect of features common to the set of items; selecting at least one feature aspect from the set of feature aspects based on at least one implicit intent of the user; generating, from the set of items, a ranked list of items as recommended items based on the at least one feature aspect; generating, for the recommended items, a recommendation title describing the at least one feature aspect; and transmitting the recommended items and the recommendation title to be displayed together with the anchor item to the user.

In various embodiments, a non-transitory computer readable medium having instructions stored thereon is disclosed. The instructions, when executed by at least one processor, cause at least one device to perform operations including: generating a trained model based on user interaction data with respect to a website; representing each user of the website as an embedding in a heterogeneous graph based on the trained model; representing each item offered on the website as an embedding in the heterogeneous graph based on the trained model; determining an anchor item to be displayed to a user; representing the anchor item as an anchor embedding in the heterogeneous graph based on the trained model; determining a set of items based on the anchor embedding in the heterogeneous graph; determining a set of feature aspects each characterizing a respective aspect of features common to the set of items; selecting at least one feature aspect from the set of feature aspects based on at least one implicit intent of the user; generating, from the set of items, a ranked list of items as recommended items based on the at least one feature aspect; generating, for the recommended items, a recommendation title describing the at least one feature aspect; and transmitting the recommended items and the recommendation title to be displayed together with the anchor item to the user.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 3 is a block diagram illustrating various portions of a personalized item recommendation system, in accordance with some embodiments of the present teaching.

FIG. 13 illustrates exemplary results of feature aspect selection for different users, in accordance with some embodiments of the present teaching.

FIG. 14 is a flowchart illustrating an exemplary method for providing personalized item recommendations with personalized title, in accordance with some embodiments of the present teaching.

DETAILED DESCRIPTION

Figure 1:
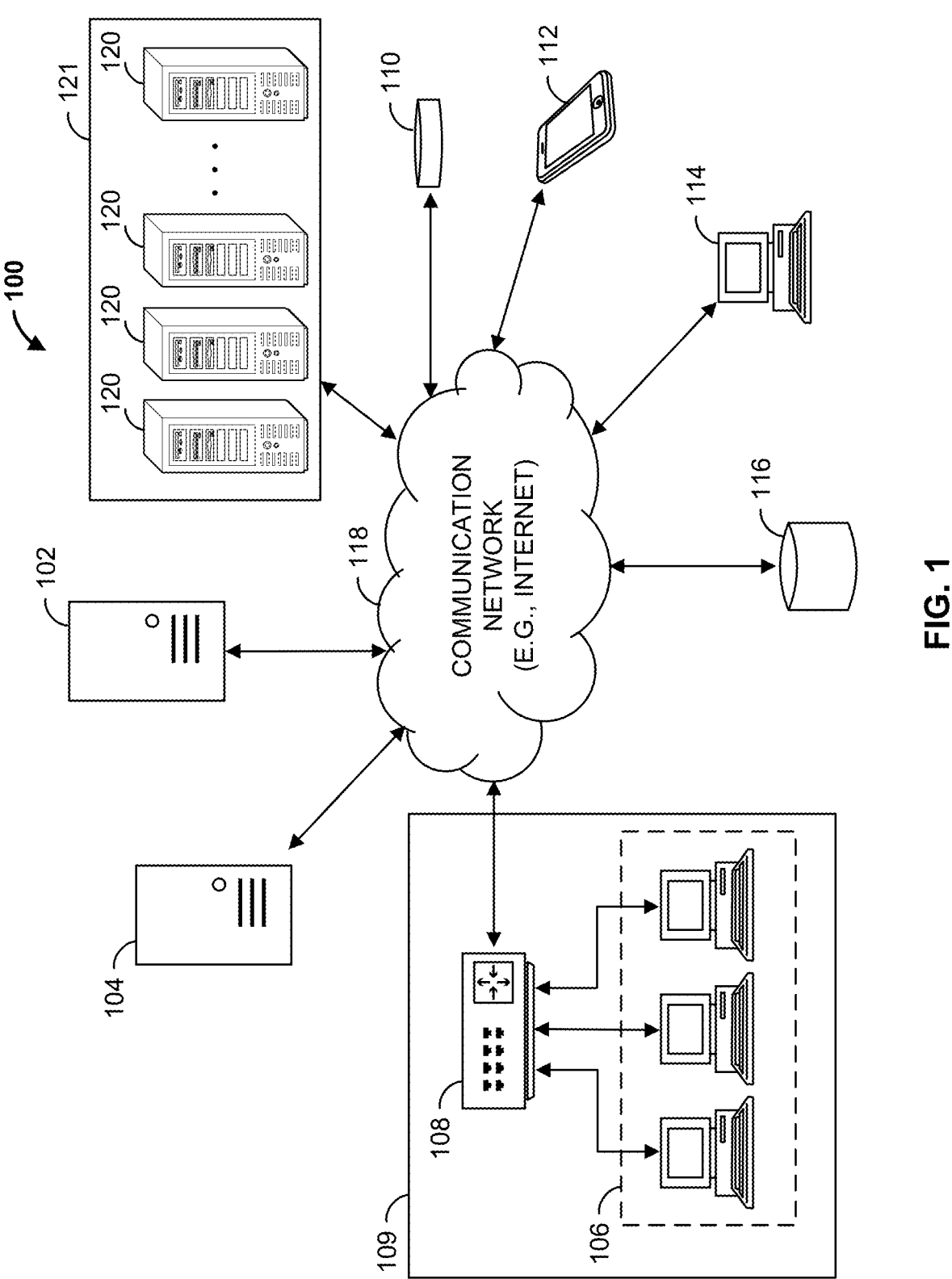
FIG. 1 is a network environment configured to provide personalized item recommendations with personalized title, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

In e-commerce, items can be recommended to users (e.g. online customers of a retailer) who are browsing a website online. Nowadays, an assortment of an online retailer may grow rapidly, which means more choices are provided to customers, but also means potentially more decision-making's are needed from the customers.

One goal of various embodiments in the present teaching is to simplify the consideration phase of the customers and save time for the customers to find what they need, based on personalized item recommendations. In some embodiments, the personalized item recommendations are appealing to the customers and show them the item recommendation system understands what they are looking for, which can increase the likelihood for their consideration of products recommended in the personalized carousels.

In some embodiments, the item recommendation system can leverage customer opinion data via feature aspects to create dynamic recommendation carousels to a user, based on an anchor item interacted with by the user. In some examples, both selected items in the carousels and the title for each carousel are generated according to a specific trait or aspect of the anchor item on which customers have opinions. For example, different feature aspects (e.g. color, price, ease of use, quality, etc.) of the anchor item can be identified based on customer reviews of the anchor item. One of the feature aspects may be selected based on implicit intent of the user. The implicit intent may be determined, e.g. based on the user's previous interaction data and/or a heterogeneous graph including nodes representing users and items. The location and embedding of each node in the heterogeneous graph can be determined based on user item interaction data, user attributes, and/or item feature aspects.

In some embodiments, the item recommendation system can leverage product description information to create dynamic recommendation carousels to a user, based on an anchor item interacted with by the user. For example, different feature aspects of the anchor item can be identified based on a product description of the anchor item. In some embodiments, different feature aspects of the anchor item can be identified based on both customer reviews and the product description of the anchor item. Again, both selected items in the carousels and the title for each carousel may be generated according to a selected feature aspect of the anchor item, based on the user's previous interaction data and/or the heterogeneous graph.

In some embodiments, the heterogeneous graph may be generated by generating random walks from collected user item interaction data and item aspect relation data, e.g. based on pre-defined metapaths. Based on different edge types between different nodes, a training data is sampled from the generated random walks. Then, the node embeddings in the heterogeneous graph are determined to maximize an objective function value based on a probability of occurrence of each training pair, given positive and negative samples.

In some embodiments, based on the generated heterogeneous graph, a set of recommended items for an anchor item can be determined based on nearest neighbor items to the anchor item in the heterogeneous graph, where the set of recommended items may be associated with multiple feature aspects of the anchor item. One of the multiple feature aspects may be selected based on an affinity between the user and different feature aspects. The affinity may be determined based on the user's previous interaction data and/or the heterogeneous graph. A recommendation title describing the selected feature aspect may be generated to be displayed to the user together with a subset of the recommended items associated with the selected feature aspect.

The disclosed item recommendation system can help customers to make better purchase decisions with more confidence, make easier the discovery of products through personalized recommendation, and increase conversion and engagement rates of customers. The system can model dynamic attributes that change over time, to intrinsically reflect the evolution of users' shopping interests. The generated heterogeneous graph can capture relationships between items (including new and unpurchased items) and increase new item visibility to customers. In some embodiments, explainable recommendation ranking treats aspects as features and uses attention mechanism to have a trained model implicitly learn the importance of aspects in customer's shopping journey. Customer preferences may be identified towards aspects of items that are frequently appreciated, e.g. in customer reviews. Customer's historical purchase behavior can be incorporated towards product attributes to help explaining customer's affinity to product aspect or attributes. In addition, a current browse journey of a user session may be used to implicitly understand the aspect, where the previous model can be potentially re-used with some sequential session representation. In some embodiments, a recommendation carousel explicitly incorporates the type of similar relationships between items based on the selected aspects. When no strong customer signal is present, e.g. when the customer is new, contextual explore-exploit can be performed based on the trained model and/or the generated heterogeneous graph, using contextual data from similar users from a same zip code or having a same kind of preference.

Furthermore, in the following, various embodiments are described with respect to methods and systems for providing personalized item recommendations with personalized title are disclosed. In some embodiments, each user as well as each item of a website is represented as an embedding in a same heterogeneous graph network. Based on an anchor embedding representing an anchor item in the heterogeneous graph, a set of items are determined. At least one feature aspect is selected from a set of feature aspects based on at least one implicit intent of a user, each feature aspect characterizing a respective aspect of features common to the set of items. From the set of items, a ranked list of items are generated as recommended items based on the at least one feature aspect. A recommendation title describing the at least one feature aspect is generated for the recommended items. The recommended items and the recommendation title are transmitted to be displayed together with the anchor item to the user.

Turning to the drawings, FIG. 1 is a network environment 100 configured to provide personalized item recommendations with personalized title, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, an item recommendation computing device 102 (e.g., a server, such as an application server), a web server 104, a cloud-based engine 121 including one or more processing devices 120, workstation(s) 106, a database 116, and one or more customer computing devices 110, 112, 114 operatively coupled over the network 118. The item recommendation computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the item recommendation computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the item recommendation computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the item recommendation computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109, for example. The workstation(s) 106 can communicate with the item recommendation computing device 102 over the communication network 118. The workstation(s) 106 may send data to, and receive data from, the item recommendation computing device 102. For example, the workstation(s) 106 may transmit data identifying items purchased by a customer at the store 109 to item recommendation computing device 102.

Although FIG. 1 illustrates three customer computing devices 110, 112, 114, the network environment 100 can include any number of customer computing devices 110, 112, 114. Similarly, the network environment 100 can include any number of the item recommendation computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of the customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the item recommendation computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the item recommendation computing device 102.

In some examples, the item recommendation computing device 102 may execute one or more models (e.g., algorithms), such as a machine learning model, deep learning model, statistical model, etc., to determine recommended items to advertise to the customer (i.e., item recommendations). The item recommendation computing device 102 may transmit the item recommendations to the web server 104 over the communication network 118, and the web server 104 may display advertisements for one or more of the recommended items on the website to the customer. For example, the web server 104 may display the recommended items to the customer on a homepage, a catalog webpage, an item webpage, a search results webpage, or a post-transaction webpage of the website (e.g., as the customer browses those respective webpages).

In some examples, the web server 104 transmits a recommendation request to the item recommendation computing device 102. The recommendation request may be sent together with a search query provided by the customer (e.g., via a search bar of the web browser), or a standalone recommendation request provided by a processing unit in response to the user's action on the website, e.g. interacting (e.g., engaging, clicking, or viewing) with one or more items, adding one or more items to cart, or purchasing one or more items.

In one example, a customer selects an item on a website hosted by the web server 104, e.g. by clicking on the item to view its product description details, by adding it to shopping cart, or by purchasing it. The web server 104 may treat the item as an anchor item or query item for the customer, and send a recommendation request to the item recommendation computing device 102. In response to receiving the request, the item recommendation computing device 102 may execute the one or more processors to determine recommended items that are related (e.g. substitute or complementary) to the anchor item, and transmit the recommended items to the web server 104 to be displayed together with the anchor item to the customer.

In another example, a customer submits a search query on a website hosted by the web server 104, e.g. by entering a query in a search bar. The web server 104 may send a recommendation request to the item recommendation computing device 102. In response to receiving the request, the item recommendation computing device 102 may execute the one or more processors to first determine search results including items matching the search query, and then determine recommended items that are related to one or more top items in the search results. The item recommendation computing device 102 may transmit the recommended items to the web server 104 to be displayed together with the search results to the customer.

The item recommendation computing device 102 is further operable to communicate with the database 116 over the communication network 118. For example, the item recommendation computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the item recommendation computing device 102, in some examples, the database 116 can be a local storage device, such as a hard drive, a non-volatile memory, or a USB stick. The item recommendation computing device 102 may store purchase data received from the web server 104 in the database 116. The item recommendation computing device 102 may also receive from the web server 104 user session data identifying events associated with browsing sessions, and may store the user session data in the database 116.

In some examples, the item recommendation computing device 102 generates training data for a plurality of models (e.g., machine learning models, deep learning models, statistical models, algorithms, etc.) based on historical user session data, purchase data, and/or current user session data for the users. The item recommendation computing device 102 trains the models based on their corresponding training data, and the item recommendation computing device 102 stores the models in a database, such as in the database 116 (e.g., a cloud storage).

The models, when executed by the item recommendation computing device 102, allow the item recommendation computing device 102 to determine item recommendations for one or more items to advertise to a customer. For example, the item recommendation computing device 102 may obtain the models from the database 116. The item recommendation computing device 102 may then receive, in real-time from the web server 104, current user session data identifying real-time events of the customer interacting with a website (e.g., viewing a webpage before or after placing a transaction order). In response to receiving the user session data, the item recommendation computing device 102 may execute the models to determine item recommendations for items to display to the customer. The user session data may identify actions (e.g., activity) of the customer on a website. For example, the user session data may identify item impressions, item clicks, items added to an online shopping cart, items purchased in an order, conversions, click-through rates, advertisements viewed, and/or advertisements clicked during an ongoing browsing session (e.g., the user data identifies real-time events).

In some examples, the item recommendation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, item recommendation computing device 102 may generate ranked item recommendations for items to be displayed on the website to a user.

In some examples, the recommended items are generated based on a selected feature aspect of an anchor item and based on a heterogeneous graph including trained embeddings of all items and all users of the website. The selected feature aspect may be determined based on the user's previous interaction data (e.g. user session data, user transaction data, user review data, etc.) on the website. In addition, a recommendation title describing the selected feature aspect may be generated to be displayed together with the recommended items in a carousel to the user. A carousel in this disclosure refers to a graphical and/or textual user interface, which is a website element that displays information with a set of items that one can slide, click, fade, or move into view.

Figure 2:
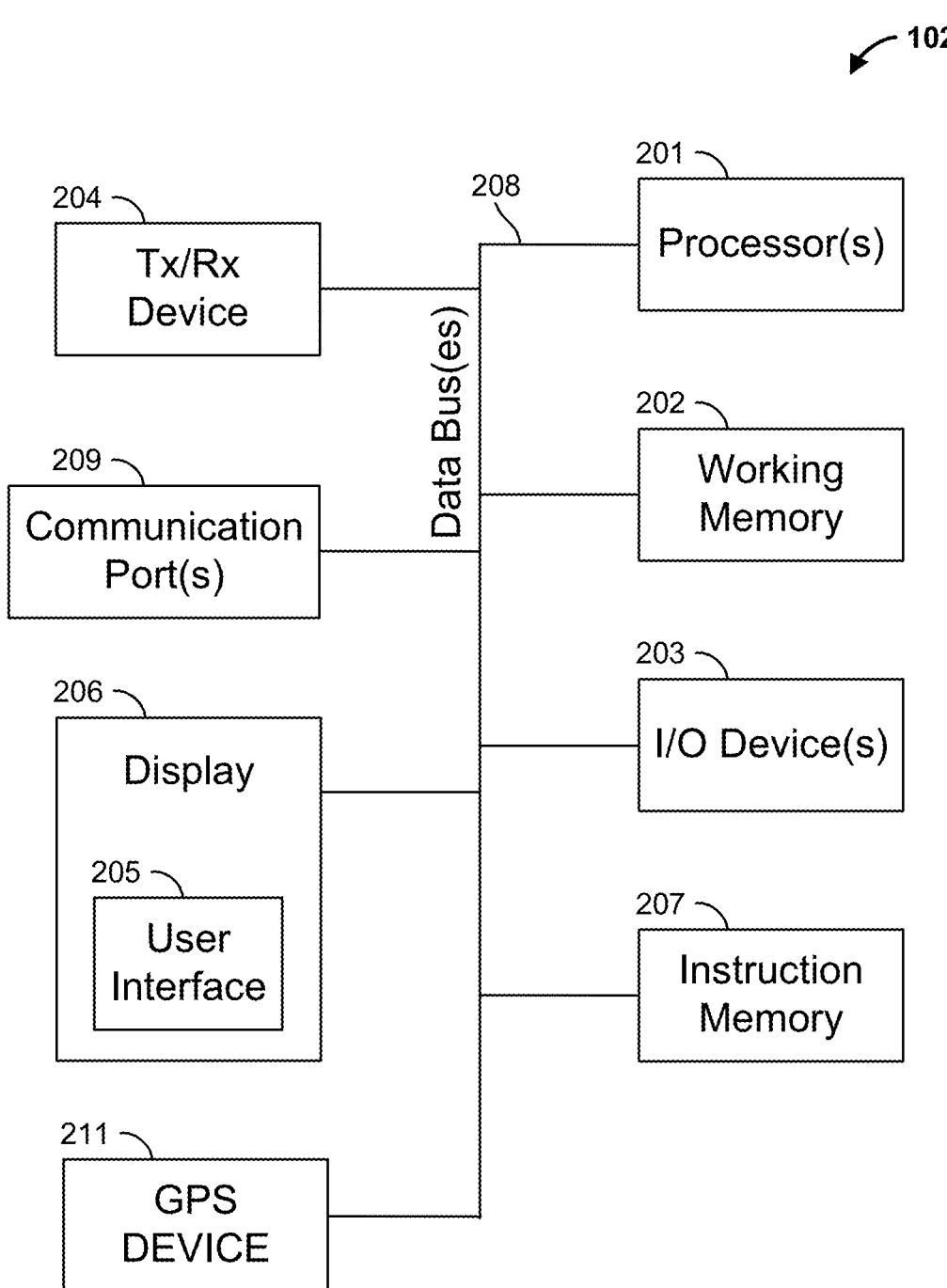
FIG. 2 is a block diagram of an item recommendation computing device, in accordance with some embodiments of the present teaching.

FIG. 2 illustrates a block diagram of an item recommendation computing device, e.g. the item recommendation computing device 102 of FIG. 1, in accordance with some embodiments of the present teaching. In some embodiments, each of the item recommendation computing device 102, the web server 104, the workstation(s) 106, the multiple customer computing devices 110, 112, 114, and the one or more processing devices 120 in FIG. 1 may include the features shown in FIG. 2. Although FIG. 2 is described with respect to the item recommendation computing device 102. It should be appreciated, however, that the elements described can be included, as applicable, in any of the item recommendation computing device 102, the web server 104, the workstation(s) 106, the multiple customer computing devices 110, 112, 114, and the one or more processing devices 120.

As shown in FIG. 2, the item recommendation computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the item recommendation computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the item recommendation computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the item recommendation computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the item recommendation computing device 102 may determine a local geographical area (e.g., town, city, state, etc.) of its position. Based on the geographical area, the item recommendation computing device 102 may determine relevant trend data (e.g., trend data identifying events in the geographical area).

FIG. 3 is a block diagram illustrating various portions of a personalized item recommendation system, e.g. the personalized item recommendation system shown in the network environment 100 of FIG. 1, in accordance with some embodiments of the present teaching. As indicated in FIG. 3, the item recommendation computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 360 and/or search query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

The search query data 330 may identify one or more searches conducted by a user during a browsing session (e.g., a current browsing session). For example, the item recommendation computing device 102 may receive a recommendation request 310 from the web server 104, where the recommendation request 310 may be associated with a search request that identifies one or more search terms provided by the user. The item recommendation computing device 102 may store the search terms as provided by the user as search query data 330. In this example, the search query data 330 includes first query 380, second query 382, and Nth query 384.

The item recommendation computing device 102 may also receive online purchase data 304 from the web server 104, which identifies and characterizes one or more online purchases, such as purchases made by the user and other users via a retailer's website hosted by the web server 104. The item recommendation computing device 102 may also receive in-store purchase data 302 from the store 109, which identifies and characterizes one or more in-store purchases. In some embodiments, the in-store purchase data 302 may also indicate availability of items in the store 109, and/or user IDs that have selected the store 109 as a default store for picking up online orders.

The item recommendation computing device 102 may parse the in-store purchase data 302 and the online purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a product type (e.g., category) of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store recommendation model data 390 identifying and characterizing one or more recommendation models and related data. For example, the recommendation model data 390 may include an embedding model 392, a ranking model 394, a titling model 396 and an aspect selection model 398. The embedding model 392 may be used to generate node embeddings for all nodes in a heterogeneous graph, which may be a high-dimensional embedding space including users and items as nodes. Given an anchor item interacted by a user, a set of neighbor items may be determined based on the heterogeneous graph. The ranking model 394 may be used to rank the neighbor items, e.g. based on their distances to the anchor item in the heterogeneous graph. The aspect selection model 398 may be used to determine feature aspects common to the set of neighbor items, and select one of the feature aspects based on implicit intent of the user. In some embodiments, a subset of the neighbor items is generated as recommended items based on the selected feature aspect. A recommendation title describing the selected feature aspect may be generated based on the titling model 396. Both the recommended items and the recommendation title can be displayed together with the anchor item to the user.

In some examples, the database 116 may further store heterogeneous graph data 350 and user review data 352. The heterogeneous graph data 350 may identify data related to the most updated heterogeneous graph and previous heterogeneous graphs, including: e.g. node embeddings of all nodes in each heterogeneous graph, edge types of all edges connecting the nodes, attribute data of all nodes, etc. From time to time, based on new item added to the website or new user-item interaction data (e.g. new user session data, new user transaction data, and/or new user review data), the item recommendation computing device 102 may update the heterogeneous graph and store the updated heterogeneous graph in the heterogeneous graph data 350. The user review data 352 may identify user reviews of all users, including: e.g. frequently mentioned feature aspects of items in the user reviews.

In some examples, the item recommendation computing device 102 receives (e.g., in real-time) the user session data 320 for a customer interacting with a website hosted by the web server 104. In response, the item recommendation computing device 102 generates item recommendation 312 identifying recommended items to advertise to the customer, and transmits the item recommendation 312 to the web server 104.

In some examples, the recommendation request 310 may be associated with an anchor item interacted by a user, e.g. an item clicked by the user to check a product description webpage of the item. In response, the item recommendation computing device 102 generates recommended items that are close to the anchor item in the current heterogeneous graph and sharing a feature aspect with the anchor item. The shared feature aspect may be determined based on the aspect selection model 398 to identify an implicit intent of the user when the user clicked the anchor item.

The item recommendation computing device 102 may rank the recommended items based on the ranking model 394, e.g. according to their respective distances to the anchor item in the current heterogeneous graph, where a higher ranked recommended item has a closer distance to the anchor item in the current heterogeneous graph. The item recommendation computing device 102 may also generate a recommendation title describing the shared feature aspect based on the titling model 396. The item recommendation computing device 102 may transmit the item recommendations 312 including both the ranked recommended items and the recommendation title to the web server 104 to be displayed together to the user. Because the recommendation title describes a feature aspect reflecting an implicit intent of the user, there is a high likelihood that the user will be interested in the recommended items listed under the recommendation title.

In some embodiments, the item recommendation computing device 102 may assign one or more of the above described operations to a different processing unit or virtual machine hosted by the one or more processing devices 120. Further, the item recommendation computing device 102 may obtain the outputs of the these assigned operations from the processing units, and generate the item recommendations 312 based on the outputs.

Figure 4:
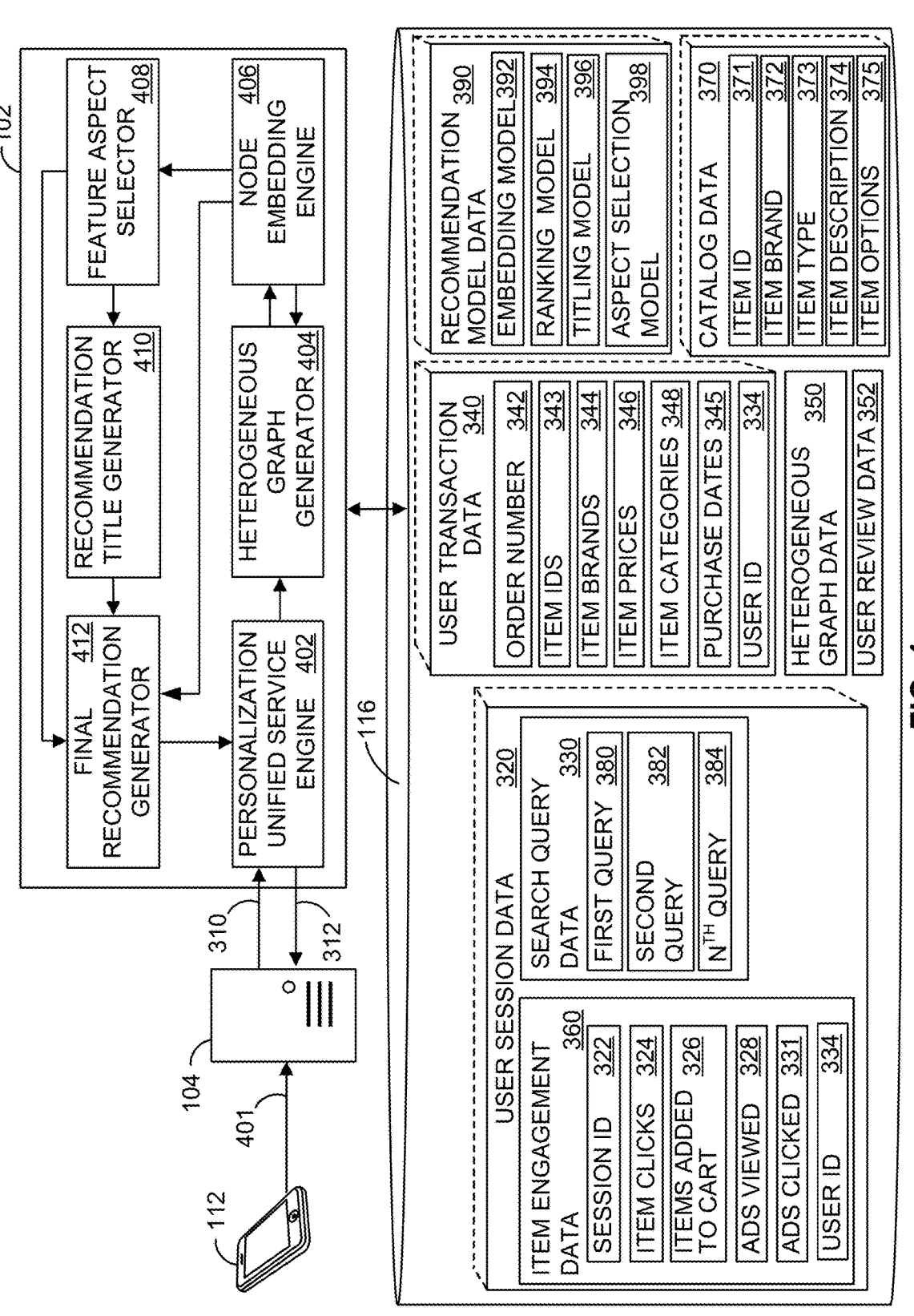
FIG. 4 is a block diagram illustrating various portions of an item recommendation computing device, in accordance with some embodiments of the present teaching.

FIG. 4 is a block diagram illustrating a more detailed view of an item recommendation computing device, e.g. the item recommendation computing device 102 in FIG. 1, in accordance with some embodiments of the present teaching. As shown in FIG. 4, the item recommendation computing device 102 includes a personalization unified service engine 402, a heterogeneous graph generator 404, a node embedding engine 406, a feature aspect selector 408, a recommendation title generator 410, and a final recommendation generator 412. In some examples, one or more of the personalization unified service engine 402, the heterogeneous graph generator 404, the node embedding engine 406, the feature aspect selector 408, the recommendation title generator 410 and the final recommendation generator 412 are implemented in hardware. In some examples, one or more of the personalization unified service engine 402, the heterogeneous graph generator 404, the node embedding engine 406, the feature aspect selector 408, the recommendation title generator 410 and the final recommendation generator 412 are implemented as an executable program maintained in a tangible, non-transitory memory, such as instruction memory 207 of FIG. 2, which may be executed by one or processors, such as the processor 201 of FIG. 2.

For example, the personalization unified service engine 402 may obtain from the web server 104 a recommendation request 310 as a message 401 is sent from the user device 112 to the web server 104, and may execute recommendation model(s) included in the recommendation model data 390. The message 401 sent by the user using the user device 112 may indicate a search query or an anchor item interacted with by the user. The recommendation request 310 may either include information about the anchor item, or indicate the anchor item in the user session data 320. In some embodiments, the recommendation request 310 is to seek one or more personalized recommended items that are related to a feature aspect associated with the anchor item, where the feature aspect can indicate an implicit intent of the user, e.g. a reason that the user interacted with the anchor item. When the recommendation request 310 indicates a search query, the item recommendation computing device 102 may treat one or more top items matching the search query as the anchor item for personalized item recommendation.

In this example, the web server 104 transmits a recommendation request 310 to the item recommendation computing device 102. The recommendation request 310 may include a request for item recommendations for presentation to a particular user using the user device 112. In some examples, the recommendation request 310 further identifies a user (e.g., customer) for whom the item recommendations are requested at the web server 104. The personalization unified service engine 402 receives the recommendation request 310, and receives and parses the user session data 320 (e.g., user session data associated with a current user session of the user in real-time). The personalization unified service engine 402 may provide to the heterogeneous graph generator 404 the user session data 320 and/or other data, which may include the user transaction data 340, the heterogeneous graph data 350, and/or the user review data 352 extracted from the database 116.

In some embodiments, the heterogeneous graph generator 404 can obtain or collect various user interaction data with respect to a website hosted by the web server 104, including: the user session data 320 including data of the items added-to-cart 326, the user transaction data 340 including the user ID 334 and data about the purchased item, the user review data 352 identifying user reviews of different items, and the catalog data 370 including the item description data 374, either from the personalization unified service engine 402 or directly from the database 116. The heterogeneous graph generator 404 may either generate or update a heterogeneous graph including nodes, where at least some of the nodes are connected by edges. Each node represent either a user or an item, while each edge may represent a relationship between two nodes connected by the edge, e.g. a relation based on a transaction or added-to-cart.

In some examples, based on these collected data, the heterogeneous graph generator 404 can generate and store a heterogeneous graph in the heterogeneous graph data 350 in the database 116, working together with the node embedding engine 406 during a model training phase. During the model training phase, the node embedding engine 406 can generate initial user embeddings based on user features and generate initial item embeddings based on item attributes, for training the embedding model 392 and generating the heterogeneous graph. The user features may include age, gender, shopping persona, etc. for the users. The item attributes may include brand, price, product category, product type, etc. for the items. The node embedding engine 406 may send the generated user and item embeddings to the heterogeneous graph generator 404 for training and optimization.

In some embodiments, the heterogeneous graph generator 404 may generate some random walks from the collected data based on some pre-defined metapaths. The heterogeneous graph generator 404 may generate or collect training data from the generated random walks based on different edge types. One goal of the training at the heterogeneous graph generator 404 is to find user and item embeddings that can maximize an objective function value based on a probability of occurrence of a training pair given positive and negative training samples. For example, the heterogeneous graph generator 404 and the node embedding engine 406 may perform iteratively to maximize the objective function value. Based on user and item embeddings generated by the node embedding engine 406, the heterogeneous graph generator 404 may compute a first objective function value using a first batch of positive and negative training samples. Based on the first objective function value, the node embedding engine 406 may generate updated user and item embeddings, e.g. with each embedding plus and minus a delta, and send the updated user and item embeddings to the heterogeneous graph generator 404 for computing a second objective function value using a second batch of positive and negative training samples in next iteration. Based on a comparison of the first objective function value and the second objective function value, the node embedding engine 406 can further update the user and item embeddings in a direction to increase the objective function value. Without loss of generality, the model here is assumed to be optimized when the objective function value is maximized. The iteration may stop based on a predetermined criterion, e.g. when the objective function value reaches a largest possible value, when the objective function value does not increase after a predetermined number of iterations, when a change of the objective function value between two consecutive iterations is below a predetermined threshold, or after all possible embeddings have been tried, to identify the final user and item embeddings that can maximize the objective function value. According to the final user and item embeddings, the heterogeneous graph generator 404 can update model parameters to generate a heterogeneous graph and the trained embedding model 392. The heterogeneous graph generator 404 can store the heterogeneous graph into the heterogeneous graph data 350 in the database 116.

In some embodiments, the heterogeneous graph generator 404 can retrieve a current heterogeneous graph from the heterogeneous graph data 350, and re-train the embedding model 392 to generate an updated heterogeneous graph based on updated training data, updated user item preference data, and/or updated item aspect relation data. The heterogeneous graph generator 404 can store the updated heterogeneous graph into the heterogeneous graph data 350 in the database 116. In some embodiments, the heterogeneous graph may be utilized to learn user aspect affinity, identifying an affinity between each user and different feature aspects of different items.

During an inference phase or recommendation phase, the heterogeneous graph generator 404 may retrieve a trained or generated heterogeneous graph from the heterogeneous graph data 350, such that the node embedding engine 406 can represent each user of the website as an embedding in the heterogeneous graph and represent each item offered on the website as an embedding in the heterogeneous graph. In some embodiments, the node embedding engine 406 determines an anchor item to be displayed to a user, e.g. based on the parsed recommendation request. The node embedding engine 406 can represent the anchor item as an anchor embedding in the heterogeneous graph, and determine a set of items based on the anchor embedding in the heterogeneous graph. For example, the node embedding engine 406 can determine top K nearest neighbor items for the anchor item, based on L2 distances between each item embedding and the anchor embedding in the heterogeneous graph. In some embodiments, the node embedding engine 406 may send the set of items to the final recommendation generator 412 for generating personalized item recommendation, and to the feature aspect selector 408 for feature aspect selection.

In some embodiments, the feature aspect selector 408 may obtain the set of items from the node embedding engine 406, and determine a set of feature aspects each characterizing a respective aspect of features common to the set of items. The feature aspect selector 408 may then select at least one feature aspect from the set of feature aspects based on at least one implicit intent of the user. In some examples, the at least one implicit intent of the user may be determined based on the user's historical interaction data with the website, the user's review of similar or related items, the user's transaction data of similar or related items, etc. In some examples, the at least one implicit intent of the user may be determined based on the heterogeneous graph. For example, when the user is a new user with little or no historical interaction data with similar or related items, the heterogeneous graph can be used to find similar or nearest users to the user, e.g. based on L2 distances between each user embedding and the user's embedding in the heterogeneous graph. In some embodiments, the user aspect affinity data of these nearest users can be utilized to estimate the user's affinity to feature aspects. In some embodiments, once the user's embedding is determined, feature aspects common to item embeddings close to the user's embedding in the heterogeneous graph can be utilized to estimate the user's preferred feature aspects. As such, the at least one feature aspect may be selected based on the user's estimated feature aspect affinity or preference. In some embodiments, the feature aspect selector 408 may generate and/or select the at least one feature aspect based on a pre-trained model, e.g. the aspect selection model 398 in the database 116. The aspect selection model 398 may be trained based on historical transaction data in response to previous personalized item recommendations generated based on the heterogeneous graph. The feature aspect selector 408 may send the selected at least one feature aspect to the recommendation title generator 410 for recommendation title generation.

The recommendation title generator 410 in this example may obtain the selected at least one feature aspect from the feature aspect selector 408, and generate a recommendation title describing the selected at least one feature aspect. The recommendation title is a personalized title for recommended items in response to the recommendation request 310. In some embodiments, the recommendation title generator 410 may generate the recommendation title based on a pre-trained model, e.g. the titling model 396 in the database 116. The titling model 396 may be trained based on historical transaction data in response to previous personalized item recommendations including previous personalized titles generated based on the heterogeneous graph. The recommendation title generator 410 may send the recommendation title, together with the selected at least one feature aspect, to the final recommendation generator 412 for generating personalized item recommendation.

The final recommendation generator 412 in this example may obtain the set of items from the node embedding engine 406, and generate, from the set of items, a ranked list of items as recommended items based on the selected at least one feature aspect. For example, each item of the ranked list of items may be associated with the selected at least one feature aspect. The ranked list of items may be a subset of the set of items from the node embedding engine 406. The final recommendation generator 412 may rank the ranked list of items based on a pre-trained model, e.g. the ranking model 394 in the database 116. The ranked list of items may be ranked based on their L2 distances to the anchor item, and/or based on their affinity scores (e.g. based on user review data) with respect to the selected at least one feature aspect. The ranking model 394 may be trained based on historical transaction data in response to previous personalized item recommendations including previous ranked lists of recommended items generated based on the heterogeneous graph. The final recommendation generator 412 may generate the item recommendations 312 based on the ranked list of items and the recommendation title, and send the item recommendations 312 to the personalization unified service engine 402.

The personalization unified service engine 402 may receive the item recommendations 312 from the final recommendation generator 412 in a data format (e.g., message) acceptable by the web server 104. The personalization unified service engine 402 transmits the item recommendations 312 to web server 104. The web server 104 may then update or generate item recommendations for presentation to the user via the user device 112 based on the item recommendations 312. For example, the item recommendations may be displayed on a webpage showing a product description of the anchor item to the user, on a webpage showing search results including the anchor item to the user, on a webpage showing a shopping cart including the anchor item to the user, and/or on a webpage showing an order of the anchor item placed by the user.

Figure 5:
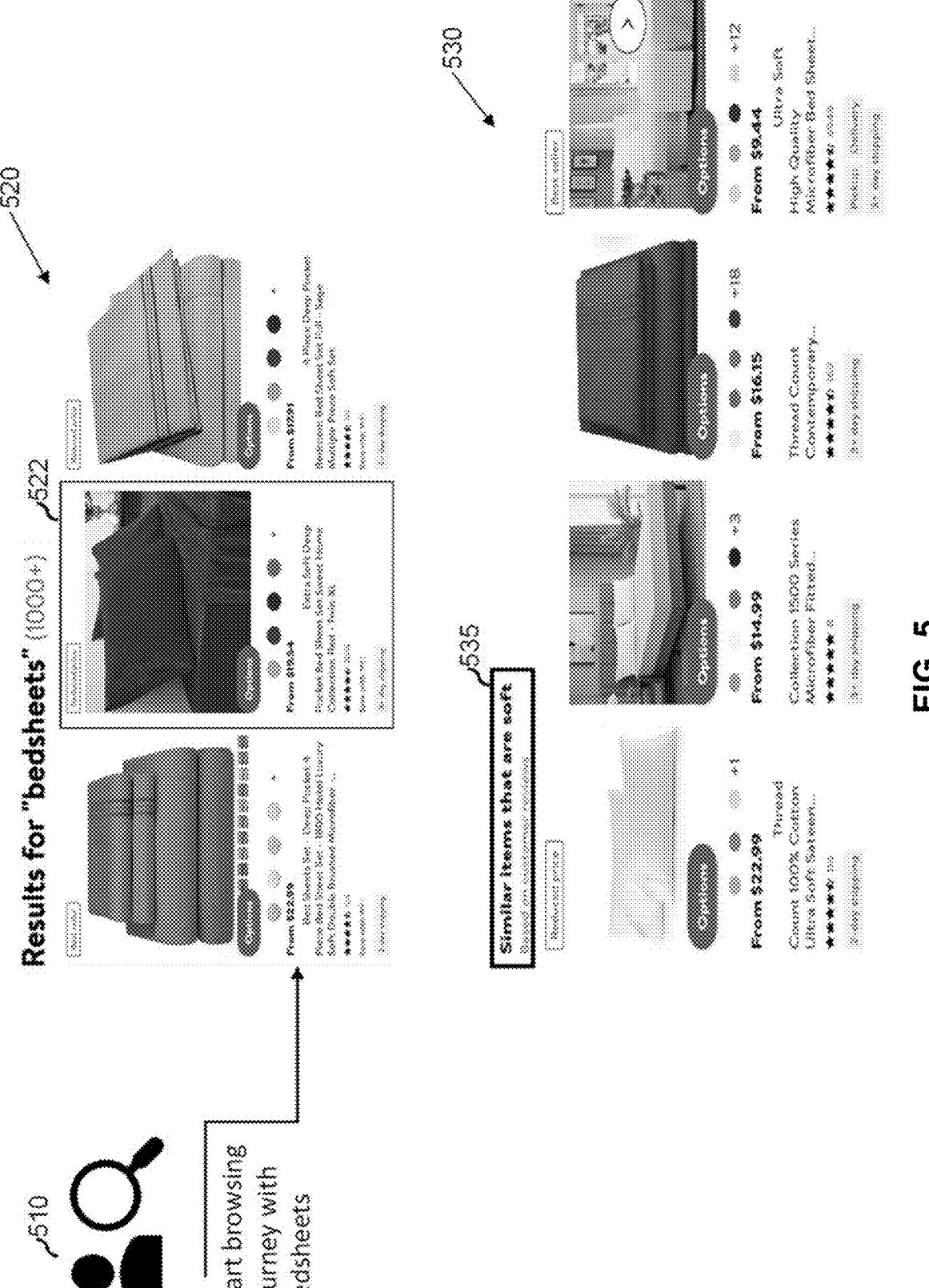
FIG. 5 illustrates an example of personalized item recommendation based on user interaction data, in accordance with some embodiments of the present teaching.

FIG. 5 illustrates an example of personalized item recommendation based on user interaction data, in accordance with some embodiments of the present teaching. As shown in FIG. 5, a user 510 starts a browsing journey with bedsheets on a website, e.g. by submitting a search query "bedsheets." In response to the search query, a first carousel 520 is displayed on the website. As shown in FIG. 5, the first carousel 520 includes a first set of items as search results for the search query "bedsheets." There may be more than 1000 search results in the first carousel 520, based on a match between all items offered by the website and the search query "bedsheets." The user 510 may show interests in an item of the first set of items by clicking or selecting this item to check detailed information (e.g. product description, user reviews, more item images, etc.) about the item.

In the example shown in FIG. 5, the user 510 clicks or selects a bedsheet item 522 to check its detailed information. In response to this selection of the user 510, the website can provide personalized item recommendations to the user 510 using the bedsheet item 522 as an anchor item, e.g. based on the disclosed system and method above and below. One goal of the personalized item recommendations is to provide the user 510 more items similar to the selected bedsheet item 522, by exploring an implicit intent of the user 510 or an implicit reason for the user 510 to select the bedsheet item 522. Another goal of the personalized item recommendations is to display to the user 510 a feature aspect that is common to the anchor item and the items in the personalized item recommendations, once the feature aspect has been determined to reflect the implicit intent of the user 510. The feature aspect may be related to some social features of the items, and may be displayed with some social proof to help the user 510 to reduce discovery time and make decisions easily.

As shown in FIG. 5, based on the anchor item 522 selected by the user 510, the website can provide a second carousel 530 including personalized item recommendations to the user 510. In this example, the second carousel 530 includes additional bedsheet items that are similar to the selected bedsheet item 522, in terms of a feature aspect "soft." For example, the system may have determined that the user 510 is interested in soft bedsheets, based on: e.g. historical interactions with the website by the user 510, a displayed title of the anchor item 522 in the first carousel 520, a product description of the anchor item 522, user reviews of the anchor item 522, and/or users and items that are closest to the user 510 in a previously generated heterogeneous graph. As "soft" has been determined to reflect an implicit intent of the user 510 when the anchor item 522 is selected, all the recommended items in the second carousel 530 are soft bedsheets based on their product descriptions and/or user reviews, although the term "soft" was not included in any search query submitted by the user 510. The second carousel 530 may be displayed to the user 510 on a same webpage as the first carousel 520 once the selected bedsheet item 522 is selected, or displayed to the user 510 on a webpage showing detailed product information of the selected bedsheet item 522.

As shown in FIG. 5, the second carousel 530 also includes a recommendation title (or header) 535 describing the feature aspect "soft," which reflects the implicit intent of the user 510. The recommendation title 535 in this example recites "Similar items that are soft," to tell the user 510 that the second carousel 530 is listing additional soft bedsheets for review or browse. In addition, the recommendation title 535 also includes a proof or reason why the items in the second carousel 530 are determined to be soft, by reciting "Based on customer reviews." In some embodiments, the items in the second carousel 530 may also be determined to be soft based on their product descriptions. In general, a personalized recommendation title like the recommendation title 535 can explain how the items in the corresponding carousel are related to the anchor item, based on a user affinity model specific to the user 510.

In some embodiments, a bedsheet selected by a user can have different feature aspects, e.g. colorful, soft, fit, deep pockets, high thread-count, etc. The item recommendation system can determine and select one of these feature aspects to generate a recommendation title when a personalized recommendation is provided. The selection may be based on the user's affinity to the different feature aspects, e.g. in view of the user's previous interaction data on the website. For example, after the user has interacted with 5 items in bedsheet item category, the system can determine what is the most important attribute or feature aspect that stands out among all of the 5 items, e.g. based on most frequently mentioned features in user reviews, most frequently mentioned attributes in product descriptions, most frequently mentioned attributes in product titles, etc. The most important attribute or feature aspect can be determined to reflect an interest or intent shown by the user. In the example shown in FIG. 5, "soft" is determined to be the bedsheets' most important attribute or feature aspect that attracts the user 510.

In some embodiments, a user may have shown multiple interests in a product category. For example, after the user has interacted with 10 items in bedsheet item category, the system may determine 2 or more most important attributes that stand out among all of the 10 items, which reflects 2 or more implicit intents of the user. In this case, all of the 2 or more implicit intents may be considered to provide personalized recommended items to the user, while one of the implicit intents may be selected to generate a recommendation title for the personalized recommended items.

Figure 6:
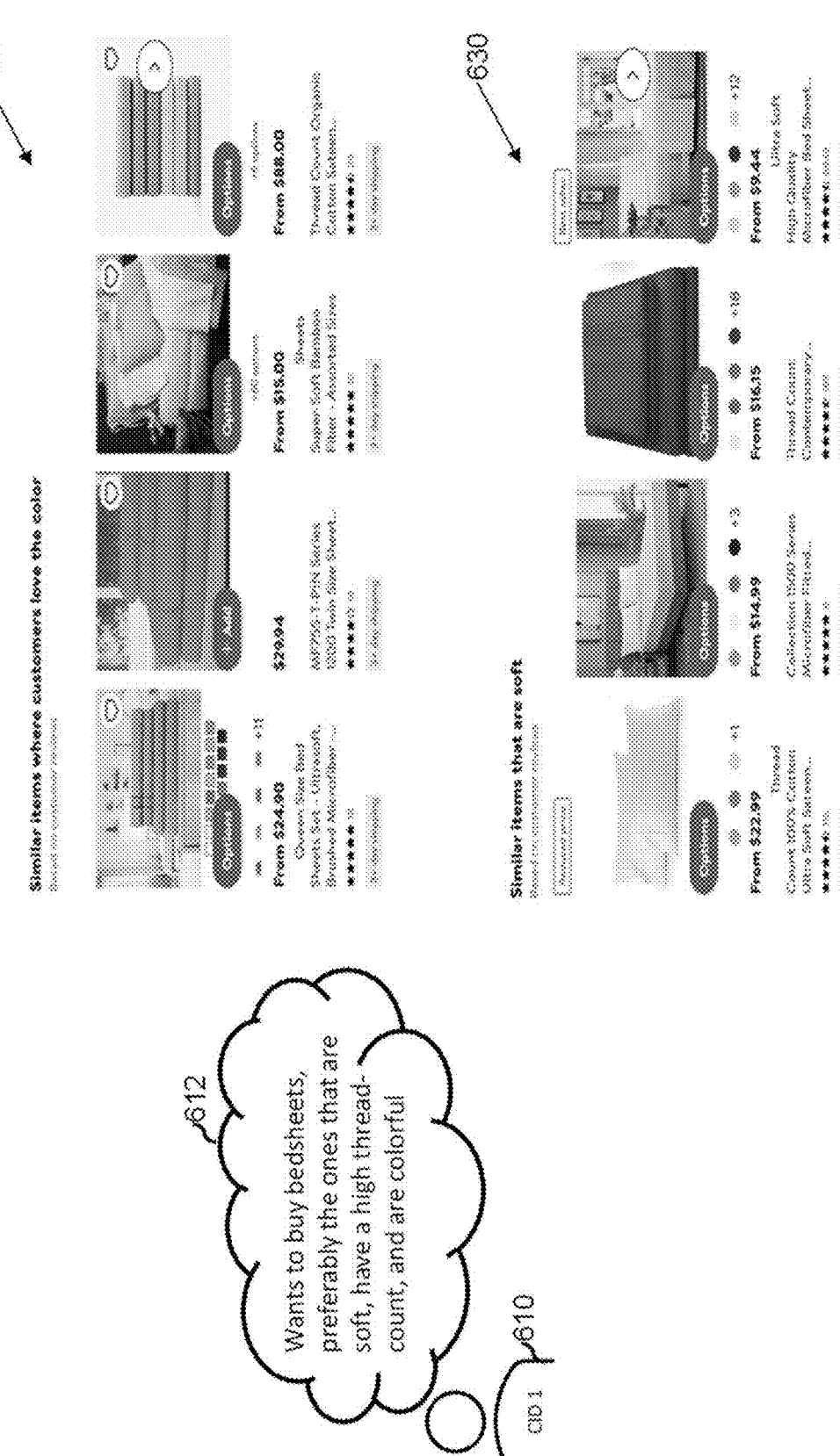
FIG. 6 illustrates an example of personalized item recommendation based on implicit intent of a first user, in accordance with some embodiments of the present teaching.

FIG. 6 illustrates an example of personalized item recommendation based on implicit intent of a first user 610, in accordance with some embodiments of the present teaching. In the example shown in FIG. 6, the first user 610 has a customer ID (CID) 1 based on interaction history of the first user 610 on a website. Based on user interaction data (e.g. user session data, user transaction data, user reviews, etc.) associated with the CID 1, the system can generate or determine an intent profile 612 that captures explicit and implicit intents of the user 610. As shown in FIG. 6, the intent profile 612 indicates that the user 610 wants to buy bedsheets, preferably the ones that are soft, have a high thread-count, and are colorful. In some examples, while the user 610 has explicitly shown interests to buy bedsheets, feature aspects like "soft," "high thread-count," and "colorful" are indications of implicit intents of the user 610.

In some embodiments, among the implicit intents of the user 610, "colorful" is determined to be a main or dominant implicit intent of the user 610. As such, a personalized carousel 620 is generated to include personalized item recommendations and a personalized recommendation title, based on the main implicit intent "colorful." The personalized carousel 620 may be displayed to the user 610 on a webpage associated with an anchor item or a search query. As shown in FIG. 6, the personalized carousel 620 includes recommended bedsheets that are colorful, e.g. based on customer reviews appreciating the colors of the recommended bedsheets. The personalized carousel 620 also includes a recommendation title reciting "Similar items where customers love the color," to explain a personalized feature aspect "colorful" with respect to the recommended bedsheets in the personalized carousel 620. In some embodiments, the recommended bedsheets in the personalized carousel 620 are selected not only based on the main implicit intent "colorful," but also based on other implicit intents of the user 610. For example, the recommended bedsheets in the personalized carousel 620 may be soft, colorful and have a high thread-count, while the recommended bedsheets are ranked in the personalized carousel 620 according to their degrees of colorfulness.

In some embodiments, among the implicit intents of the user 610, "soft" is determined to be a main or dominant implicit intent of the user 610. As such, a personalized carousel 630 is generated to include personalized item recommendations and a personalized recommendation title, based on the main implicit intent "soft." The personalized carousel 630 may be displayed to the user 610 on a webpage associated with an anchor item or a search query. As shown in FIG. 6, the personalized carousel 630 includes recommended bedsheets that are soft, e.g. based on customer reviews indicating or appreciating the softness of the recommended bedsheets. The personalized carousel 630 also includes a recommendation title reciting "Similar items that are soft," to explain a personalized feature aspect "soft" with respect to the recommended bedsheets in the personalized carousel 630. In some embodiments, the recommended bedsheets in the personalized carousel 630 are selected not only based on the main implicit intent "soft," but also based on other implicit intents of the user 610. For example, the recommended bedsheets in the personalized carousel 630 may be soft, colorful and have a high thread-count, while the recommended bedsheets are ranked in the personalized carousel 620 according to their degrees of softness.

Figure 7:
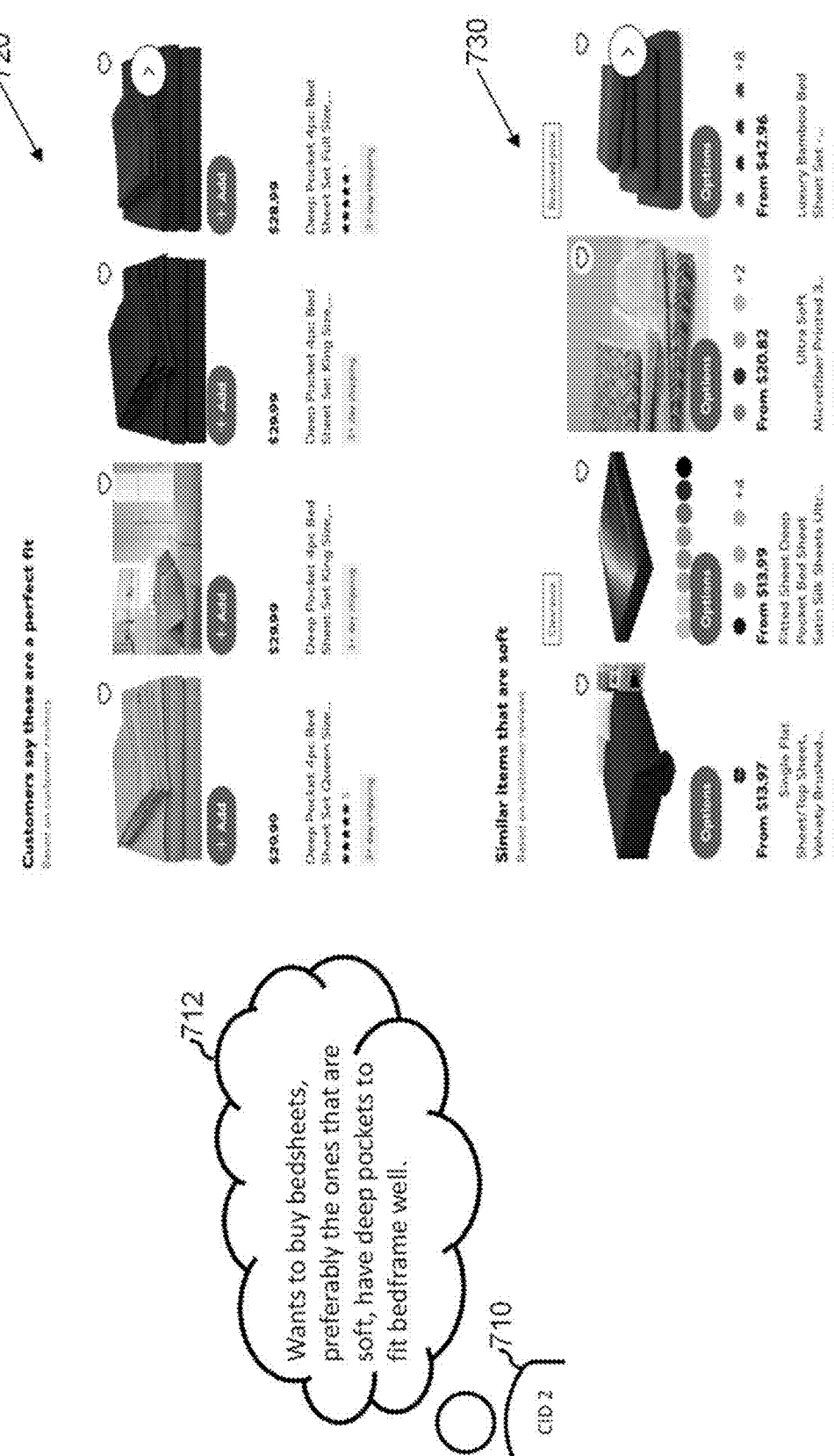
FIG. 7 illustrates an example of personalized item recommendation based on implicit intent of a second user, in accordance with some embodiments of the present teaching.

FIG. 7 illustrates an example of personalized item recommendation based on implicit intent of a second user 710, in accordance with some embodiments of the present teaching. In the example shown in FIG. 7, the second user 710 has a customer ID (CID) 2 based on interaction history of the second user 710 on a website. Based on user interaction data (e.g. user session data, user transaction data, user reviews, etc.) associated with the CID 2, the system can generate or determine an intent profile 712 that captures explicit and implicit intents of the user 710. As shown in FIG. 7, the intent profile 712 indicates that the user 710 wants to buy bedsheets, preferably the ones that are soft, have deep pockets to fit bedframe well. In some examples, while the user 710 has explicitly shown interests to buy bedsheets, feature aspects like "soft," "deep pockets," and "fit" are indications of implicit intents of the user 710.

In some embodiments, among the implicit intents of the user 710, "fit" is determined to be a main or dominant implicit intent of the user 710. As such, a personalized carousel 720 is generated to include personalized item recommendations and a personalized recommendation title, based on the main implicit intent "fit." The personalized carousel 720 may be displayed to the user 710 on a webpage associated with an anchor item or a search query. As shown in FIG. 7, the personalized carousel 720 includes recommended bedsheets that are a perfect fit, e.g. based on customer reviews appreciating the fitness of the recommended bedsheets. The personalized carousel 720 also includes a recommendation title reciting "Customers say these are a perfect fit," to explain a personalized feature aspect "fit" with respect to the recommended bedsheets in the personalized carousel 720. In some embodiments, the recommended bedsheets in the personalized carousel 720 are selected not only based on the main implicit intent "fit," but also based on other implicit intents of the user 710. For example, the recommended bedsheets in the personalized carousel 720 may be soft, fit and have deep pockets, while the recommended bedsheets are ranked in the personalized carousel 720 according to their degrees of fitness.

In some embodiments, among the implicit intents of the user 710, "soft" is determined to be a main or dominant implicit intent of the user 710. As such, a personalized carousel 730 is generated to include personalized item recommendations and a personalized recommendation title, based on the main implicit intent "soft." The personalized carousel 730 may be displayed to the user 710 on a webpage associated with an anchor item or a search query. As shown in FIG. 7, the personalized carousel 730 includes recommended bedsheets that are soft, e.g. based on customer reviews indicating or appreciating the softness of the recommended bedsheets. The personalized carousel 730 also includes a recommendation title reciting "Similar items that are soft," to explain a personalized feature aspect "soft" with respect to the recommended bedsheets in the personalized carousel 730. In some embodiments, the recommended bedsheets in the personalized carousel 730 are selected not only based on the main implicit intent "soft," but also based on other implicit intents of the user 710. For example, the recommended bedsheets in the personalized carousel 730 may be soft, fit and have deep pockets, while the recommended bedsheets are ranked in the personalized carousel 730 according to their degrees of softness.

Comparing the personalized carousel 730 in FIG. 7 with the personalized carousel 630 in FIG. 6, one can see that although they have a same recommendation title reciting "Similar items that are soft," the recommended items in the personalized carousel 730 and the personalized carousel 630 are different, at least for the top four items listed therein. This is because the personalized carousel 730 and the personalized carousel 630 are generated for different users based on their different implicit intents, in addition to the common intent "soft," which indicates that these carousels are indeed personalized.

In some embodiments, the recommendation titles are generated based on personalized text snippets extracted from customer reviews and/or product descriptions. Based on different language models used to generate the recommendation titles, one recommendation title may start with "Customers say . . . " (e.g. when the described feature aspect is from customer reviews), and another recommendation title may start with "Similar items . . . " (e.g. when the described feature aspect is from customer reviews, product descriptions, or product titles). In one example, a personalized recommendation title for a list of recommended televisions may recite "Customers say these have a great picture" and "Based on customer reviews." In another example, a personalized recommendation title for a list of recommended books may recite "Similar items with a hardcover" and "Based on product descriptions." In yet another example, a personalized recommendation title for a list of recommended dry sprays may recite "Customers say these smell great" and "Based on customer reviews."

While a customer browses a website, the personalized item recommendations can enable the customer to see different sets of results based on persona and intents of the customer. This helps customers to save time on item discovery and making purchase decisions, by prioritizing and showing the most important information they need first, instead of letting customers browse through too many items with generic titles and no explanation.

Figure 8:
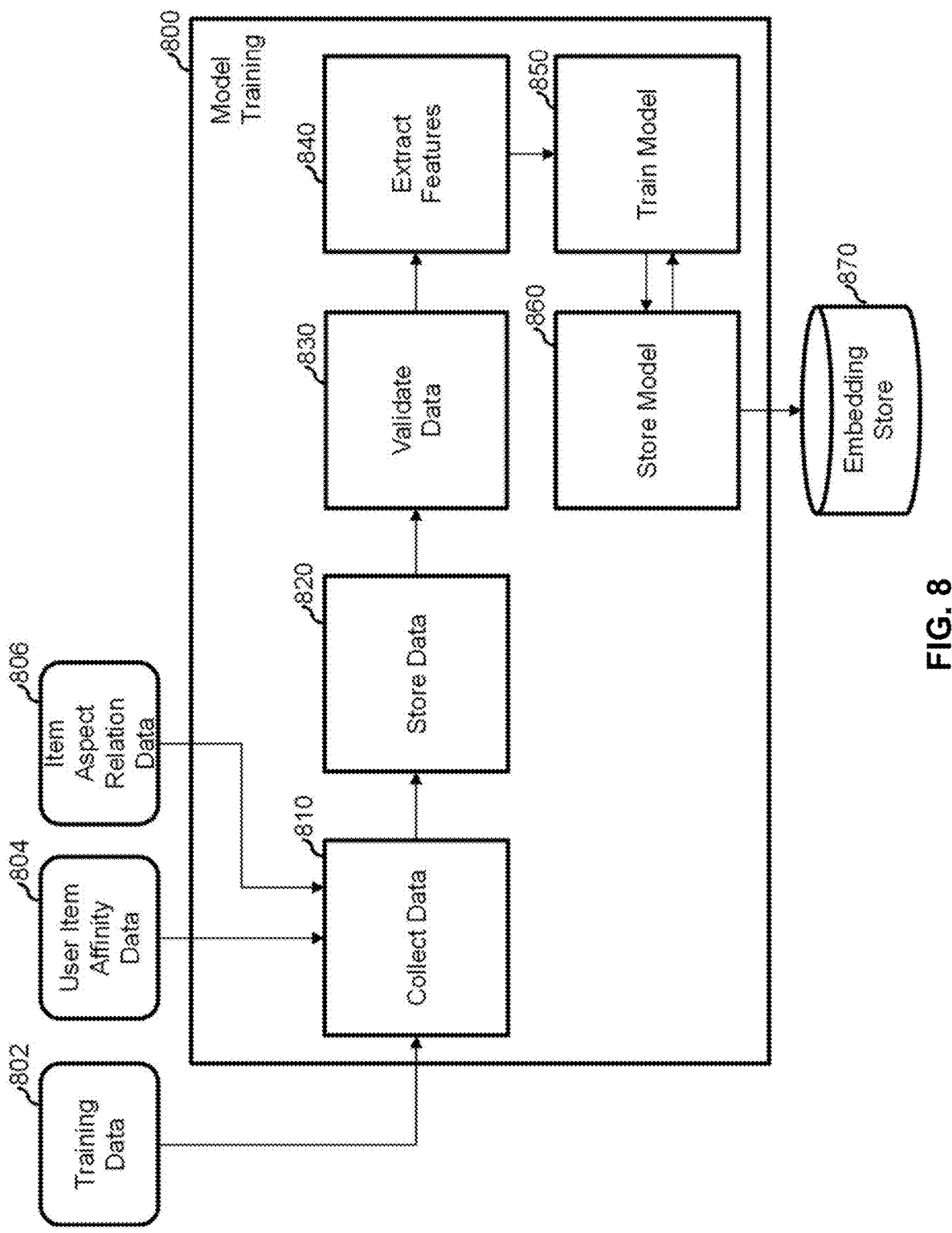
FIG. 8 illustrates a process for training a model for providing personalized item recommendations with personalized title, in accordance with some embodiments of the present teaching.

FIG. 8 illustrates a process 800 for training a model for providing personalized item recommendations with personalized title, in accordance with some embodiments of the present teaching. As shown in FIG. 8, the process 800 starts from operation 810, where various data are collected for training. For example, the collected data include: training data 802 including positive and negative samples that are generated based on historical user transaction data or experts' inputs, user item affinity data 804 indicating which user prefers which item based on website interactions (e.g. user transactions or added-to-cart related data), and item aspect relation data 806 including feature aspects frequently mentioned in user reviews and/or item descriptions for each item.

Figure 9:
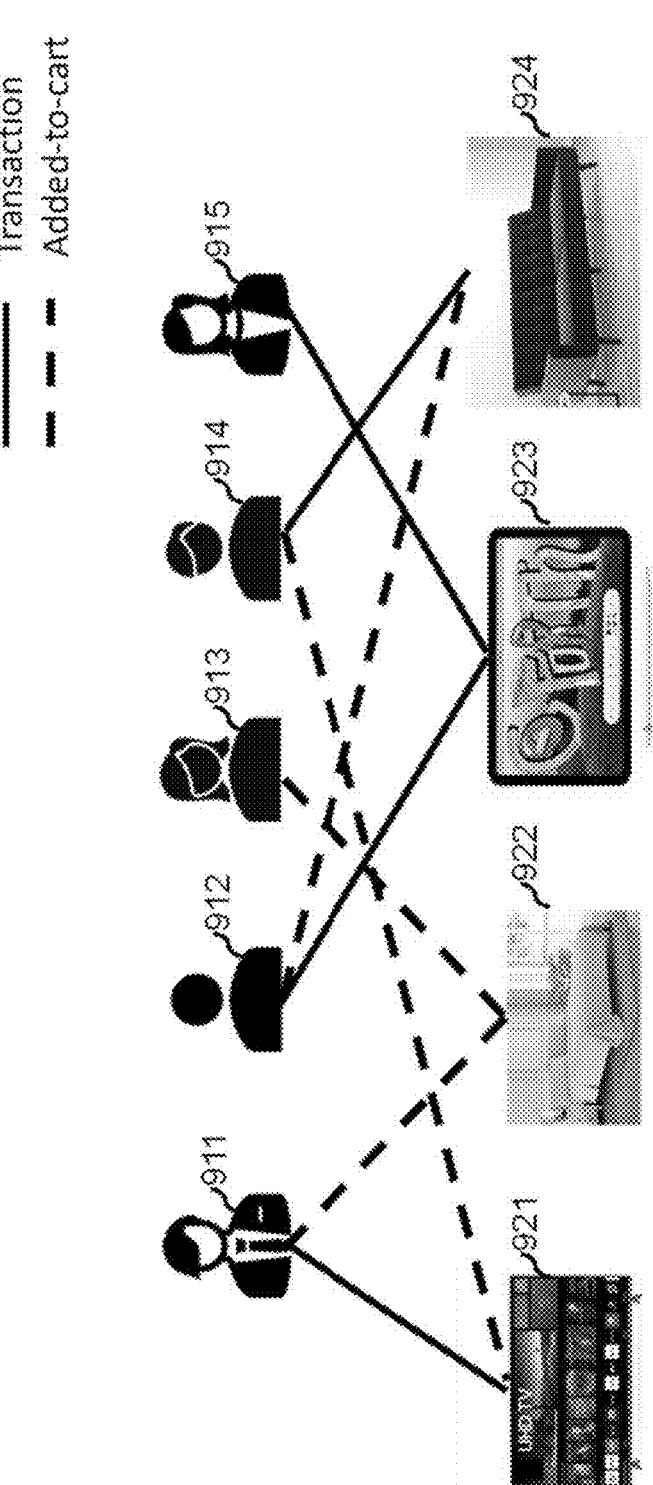
FIG. 9 illustrates an example of user item preference data, in accordance with some embodiments of the present teaching.

FIG. 9 illustrates an example of user item affinity data, e.g. the user item affinity data 804 in FIG. 8, in accordance with some embodiments of the present teaching. As shown in FIG. 9, different users 911~915 are associated with different items 921~924 with connected edges. Each edge may connect a user with an item to indicate a type of connection or preference, based on either a transaction or an action of added-to-cart. In one example, a dashed edge connecting the user 911 and the bedsheet 922 indicates that the bedsheet 922 was added to cart by the user 911. In another example, a solid edge connecting the user 914 and the sofa 924 indicates that the sofa 924 was purchased by the user 914 in a transaction.

Figure 10:
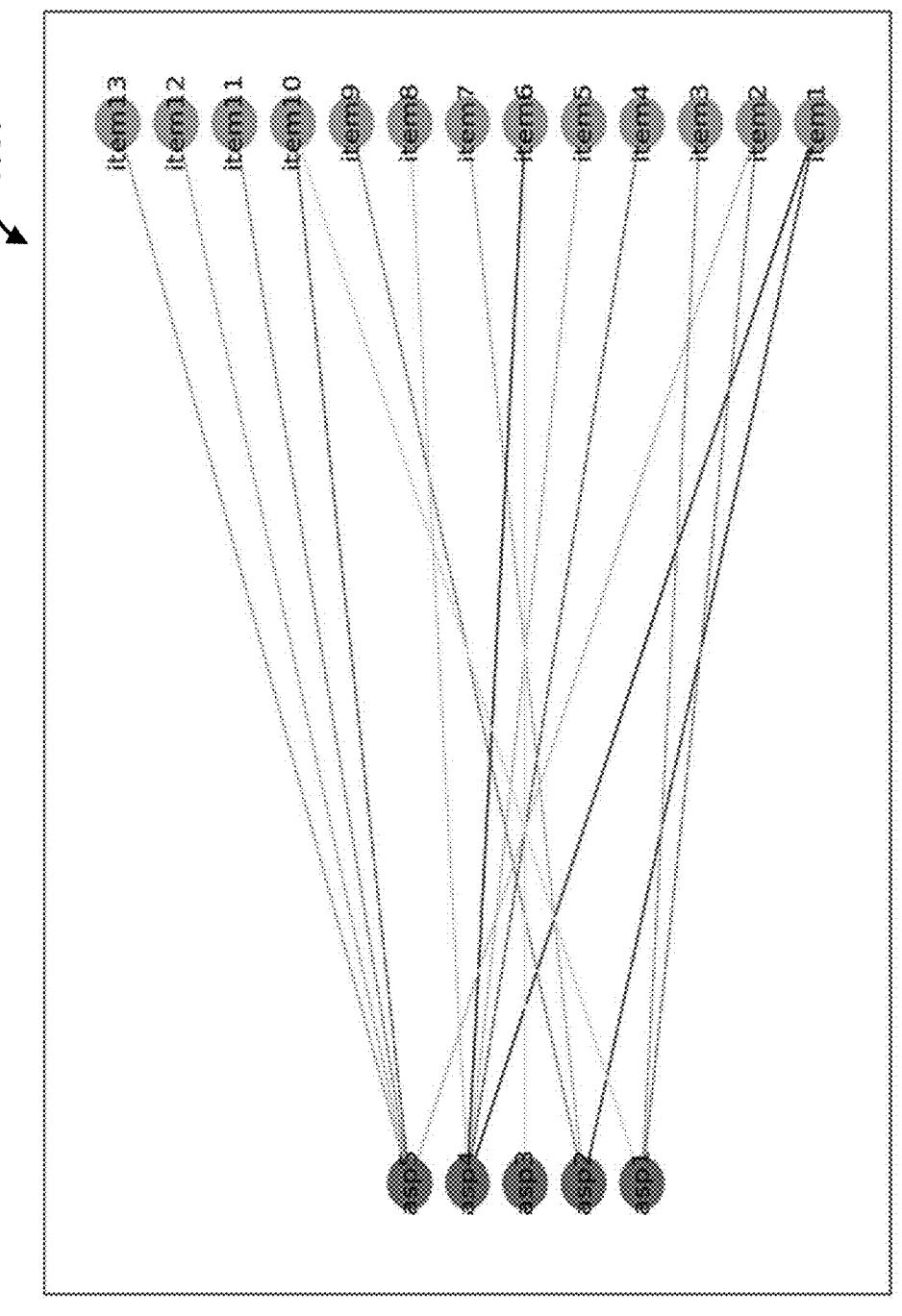
FIG. 10 illustrates an example of a graph indicating item aspect relation data, in accordance with some embodiments of the present teaching.

FIG. 10 illustrates an example of a graph 1000 indicating item aspect relation data, e.g. the item aspect relation data 806 in FIG. 8, in accordance with some embodiments of the present teaching. As shown in FIG. 10, different items 1~13 are associated with different aspects 1~5 with connected edges. In some embodiments, aspects are textual features of items extracted from user reviews or product descriptions. Each edge may connect an item with an aspect to indicate that the aspect is frequently mentioned by users in reviews for the item or frequently mentioned or emphasized in product description or product title for the item. In some embodiments, each edge may be associated with a respective weight indicating how frequent the aspect is mentioned in the user reviews or product descriptions. In some embodiments, the graph 1000 is a bipartite graph, with no item-to-item edges and no aspect-to-aspect edges.

Referring back to FIG. 8, the collected data from operation 810 may be stored at operation 820 in a database, e.g. the database 116 in FIG. 1. At operation 830, at least some of the collected data are extracted from the database and validated for training. Then features are extracted at operation 840 from the validated data. In some examples, user features may be generated or extracted from different users to act as initial user embeddings for training, where user features may include age, gender, shopping persona, etc. In some examples, item attributes or features may be extracted or determined to generate initial item embeddings, where the item attributes include brand, price, product category, product type, etc.

Figure 11:
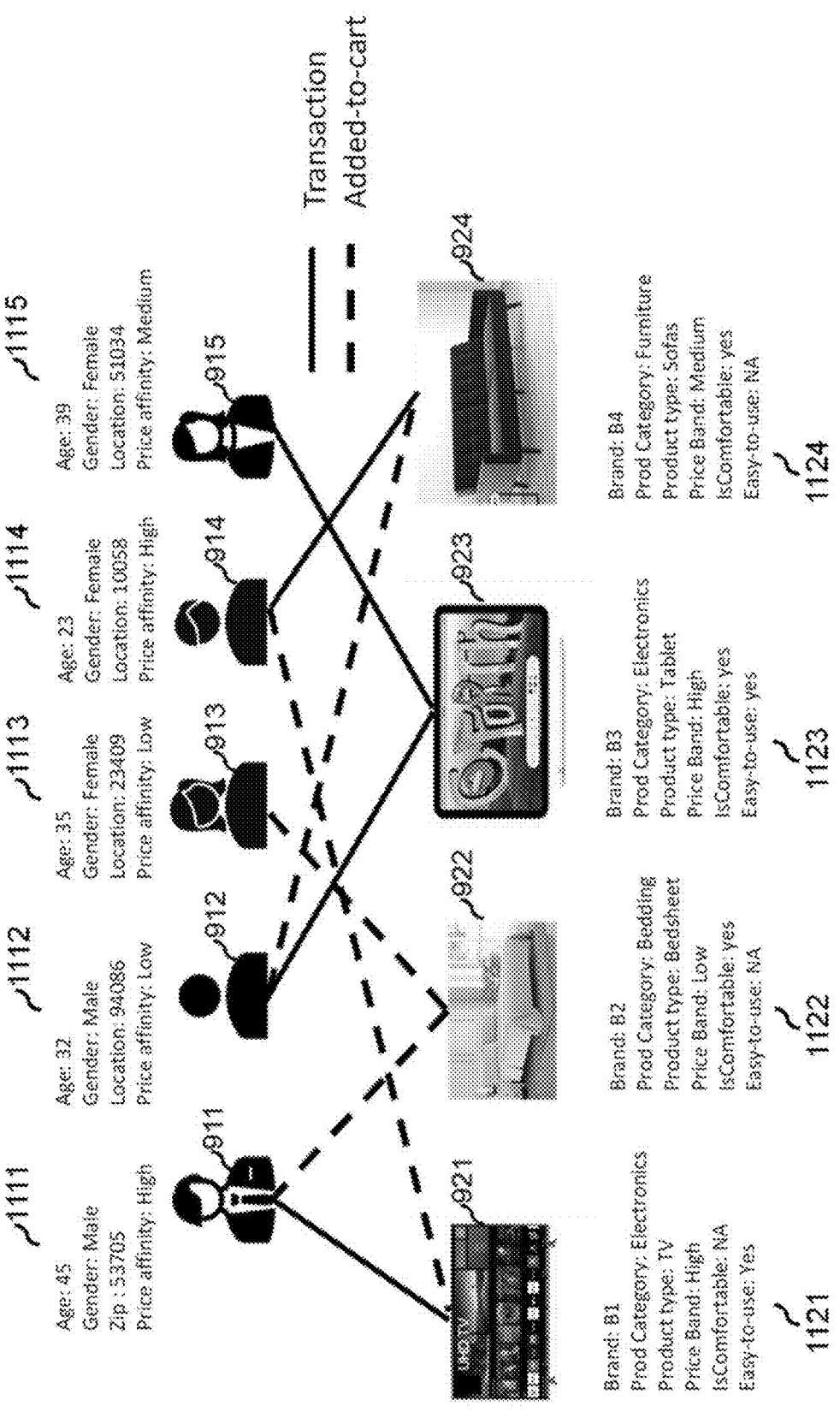
FIG. 11 illustrates exemplary features of users and items for generating node embeddings in a heterogeneous graph, in accordance with some embodiments of the present teaching.

FIG. 11 illustrates exemplary features of users and items for generating node embeddings in a heterogeneous graph, in accordance with some embodiments of the present teaching. Similar to FIG. 9, different users 911~915 in FIG. 11 are associated with different items 921~924 with connected edges, where each edge may connect a user with an item to indicate a type of connection or preference, based on either a transaction or an action of added-to-cart.

In the example shown in FIG. 11, each of the users 911~915 has a respective one of user feature sets 1111~1115. Each user feature set includes different user features describing information of a corresponding user, in terms of: e.g. age, gender, location zip code, price affinity level, etc. A price affinity level may be high, medium or low, to indicate a level of price the user is associated with, based on e.g. item prices in historical transactions of the user compared to item prices of similar items on the website. For example, the user 913 has a user feature set 1113 user features of: age is 35, gender is female, location zip code is 23409, and price affinity level is low. In some embodiments, some user features may be obtained by voluntary inputs from the users, e.g. when creating a user profile during user registration of the website, or when entering an address for delivery or picking up an order. An initial user embedding may be generated for each user based on a user feature set corresponding to the user.

In addition, as shown in FIG. 11, each of the items 921~924 has a respective one of item attribute sets 1121~1124. Each item attribute set includes different item attributes describing attributes or features of a corresponding item, in terms of: e.g. product brand, product category, product type, price band, comfortable-or-not, easy-to-use, etc. A price band may be high, medium or low, to indicate a level of price the item has, based on e.g. the item's price compared to prices of similar items on the website. For example, the item 921 has an item attribute set 1121 including item attributes of: product brand is B1, product category is Electronics, product type is TV, price band is high, and easy-to-use is Yes. In some embodiments, some item attributes may be obtained from user reviews or item descriptions for the items. In some embodiments, some item attribute may not apply to all items. For example, the attribute or feature aspect comfortable-or-not is not applicable to the TV item 921. An initial item embedding may be generated for each item based on an item attribute set corresponding to the item.

Referring back to FIG. 8, based on initial user and item embeddings generated at operation 840, at least one model may be trained at operation 850, by generating and optimizing a heterogeneous graph. In some embodiments, a heterogeneous graph $G=(V, \varepsilon, \mathcal{A})$ may be generated to include nodes, edges and attribute data. In the heterogeneous graph G, V is a node set of the graph G, where each node $v_i \in V$ represents either user or item and has some related attributes. In the heterogeneous graph G, $\varepsilon = \cup_{r \in \mathcal{R}} \varepsilon_r$ is an edge set of the graph G, where $\varepsilon_r$ are edge types like transaction or added-to-cart. For example, r=1 represents an edge type of added-to-cart; while r=2 represents an edge type of transaction. In the heterogeneous graph G, $\mathcal{A}$ represents attribute data for all nodes, where $\mathcal{A} = \{x_i | v_i \in V\}$ and $x_i$ represents an attribute of a corresponding node $v_i$. When a node $v_i$ represents a user, the corresponding $x_i$ represents a user attribute or feature aspect. When a node $v_i$ represents an item, the corresponding $x_i$ represents an item attribute or feature aspect.

In some embodiments, during the training operation 850, an overall node embedding for node $v_i$ for a given relation type r is computed based on:

$$v_{i,r} = h_z(x_i) + \alpha_r M_r^T U_i a_{i,r} + \beta_r D_z^T x_i \qquad (1)$$

In equation (1), $h_z(x_i)$ represents a transformation function (e.g. a multi-layer perceptron) from attribute $x_i$ to base embedding for $v_i$, and $z=\phi(i)$ represents a corresponding node type of node $v_i$. In equation (1), $\alpha_r$ and $\beta_r$ are hyperparameters denoting the importance of edge embedding type r towards the overall node embedding; $D_z$ represents a feature transformation matrix on $z_i$'s corresponding node type z; $M_r$ represents a trainable transformation matrix; $U_i=(u_{i,1}, u_{i,2}, \ldots u_{i,m})$ is concatenation of edge embeddings for node $v_i$ for all m edge types, where $U_i$ has a size of s×m, and $u_{i,r} \in \mathcal{R}^s$. Further in equation (1), represents a weight for each edge type r with respect to a node, and may be computed based on $a_{i,r}$=softmax $$\left(W_r^T \tanh C_r U_i\right)^T,$$

using self-attention to compute coefficients for linear combination of vectors of $U_i$ on edge type r, where $w_r$ and $C_r$ are trainable parameters for edge type r. In some embodiments, all parameters in equation (1), except $x_i$ and subscripts i and r, are trainable to be updated and optimized.

In some embodiments, during the training operation 850, some random walks may be generated from the collected data based on some defined metapaths. Each metapath may indicate a connection path from one node to another, while each random walk may travel along different metapaths to generate a possible path from a starting node to an ending node, e.g. a one-hop connection path from user 1 to item 1, a two-hop connection path from user 1 to item 1 then to item 2, or a 5-hop connection path from user 1 to item 1, item 2, user 2 and finally item 3.

In some embodiments, after user A performs a transaction including item B, different possible paths can be generated from a starting node representing user A to an ending node representing item B, based on different random walks. For example, a first random walk may indicate a possible 4-hop path from user A to item B via 2 other items and 1 other user; and a second random walk may indicate a possible 6-hop path from user A to item B via 3 other items and 2 other users. In each hop of a random walk, the edge connecting two nodes of the hop may be either edge type I that is based on Added-to-Cart, or edge type II that is based on Transaction.

In some embodiments, training triplets can be sampled from the generated random walks based on different edge types on the random walks and the training data 802. Each training triplet may include an anchor node, a positive sample and a negative sample. For example, given an anchor user node representing a user, a positive sample may be an item node representing an item that has been bought by the user, and a negative sample may be an item node representing another item that has not been bought by the user. Positive and negative samples can also be generated based on added-to-cart information, maybe with a different weight from the samples generated based on transactions. In some examples, for an anchor node representing a bedsheet, a positive sample may be another bedsheet sharing many common aspects with the anchor bedsheet, and a negative sample may be a totally unrelated item like a coffee mug.

In some embodiments, a value of an objective function is computed and maximized based on a probability of occurrence of a training pair given positive and negative samples. For example, the objective function may be a contrastive objective function based on cross entropy loss. In some embodiments, the maximization of the objective function value indicates at least one of: a maximization of a first probability of occurrence of a transaction or added-to-art of a positive sample item for each user, a minimization of a second probability of occurrence of a transaction or added-to-art of a negative sample item for each user, a maximization of a difference between the first probability and the second probability for each user, a maximization of a first weighted sum or combination of all first probabilities for all users, a minimization of a second weighted sum or combination of all second probabilities for all users, and/or a maximization of a difference between the first weighted sum or combination and the second weighted sum or combination. In some embodiments, based on the maximization of the objective function, model parameters of at least one model are updated using an optimizer e.g. stochastic gradient descent (SGD). In some embodiments, after the maximization of the objective function, similar items' embeddings will become closer to each other in the embedding space, e.g. embeddings of positive samples will be closer to each other, and away from embeddings of negative samples.

In some embodiments, the at least one model is trained in a deep learning fashion. In various embodiments, the at least one model may include one or more of the embedding model 392, the ranking model 394, the titling model 396 and the aspect selection model 398 in the database 116. In some embodiments, the at least one model includes one overall graph model that is trained to generate a heterogeneous graph, including optimized or trained node embeddings for all nodes (including user embedding for all users and item embeddings for all items) in the heterogeneous graph.

In some embodiments, the trained model can be stored at operation 860 in a database, e.g. the database 116. In some embodiments, the trained node embeddings for all nodes can be stored at operation 860 into a database, e.g. an embedding store 870, which may be part of the database 116 or a standalone database. In some embodiments, all metadata related to the generated heterogeneous graph can be stored in the embedding store 870.

Figure 12:
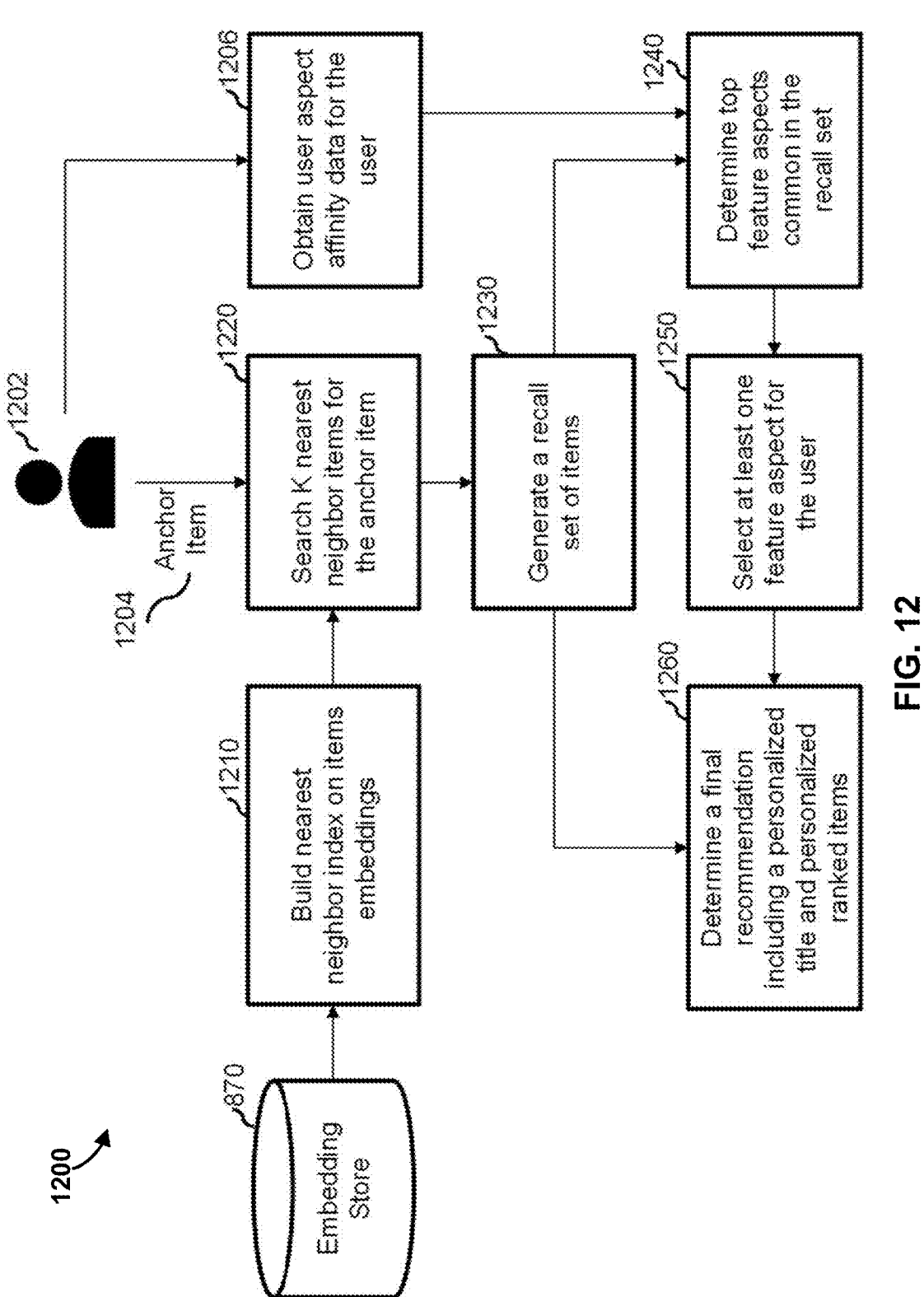
FIG. 12 illustrates a process for providing personalized item recommendations with personalized title based on a trained model, in accordance with some embodiments of the present teaching.

FIG. 12 illustrates a process 1200 for providing personalized item recommendations with personalized title based on a trained model, in accordance with some embodiments of the present teaching. As shown in FIG. 12, the process 1200 starts from operation 1210, to build one or more nearest neighbor index for each item embedding in the embedding store 870. For example, for an item X, a first index n1 may be built to indicate the nearest neighbor item of item X in the heterogeneous graph, e.g. when an item embedding of the nearest neighbor item has a least L2 distance to the embedding of item X among all item embeddings of other-than-X items in the heterogeneous graph. Similarly, a second index n2 may be built to indicate the second nearest neighbor item of item X in the heterogeneous graph, a third index n3 may be built to indicate the third nearest neighbor item of item X in the heterogeneous graph, so one and so forth. In some embodiments, the nearest neighbor index(es) are built for nearest nodes (either items or users) with respect to a given node (either item or user). This operation 1210 can be performed before any recommendation request is received for any user.

At operation 1220, an anchor item 1204 associated with a user 1202 is received, e.g. together with a recommendation request seeking personalized item recommendations for the user 1202. For example, the user 1202 may have just selected or clicked on the anchor item 1204 on a website. Based on the anchor item 1204, a search is performed at operation 1220 in the heterogeneous graph to identify K nearest neighbor items for the anchor item 1204, where K may be a predetermined positive integer. For example, an anchor embedding can first be determined to represent the anchor item 1204 in the heterogeneous graph. Then based on the nearest neighbor index(es) built up for the anchor embedding at operation 1210, the K nearest neighbor items can be quickly identified.

At operation 1230, a recall set of items are generated based on the K nearest neighbor items. For example, the recall set of items may include all or a subset of the K nearest neighbor items. Then the recall set may be sent to operation 1240 for determining feature aspects and to operation 1260 for determining a final recommendation.

As shown in FIG. 12, an operation 1206 may be performed to obtain user aspect affinity data for the user 1202. In some embodiments, the user aspect affinity data may be obtained based on one or more items interacted with by the user 1202. In some embodiments, the user aspect affinity data may be obtained based on one or more items that are nearest to an embedding of the user 1202 in the heterogeneous graph, e.g. based on data from the embedding store 870. The operation 1206 may be performed before or after the recommendation request is received from the user 1202.

Based on the user aspect affinity data and the recall set of items, a set of feature aspects is determined at operation 1240. In some embodiments, the set of feature aspects are top feature aspects common to the items in the recall set. For example, when the anchor item 1204 is bedsheet, feature aspects of a bedsheet may include: color, soft, wash well, fitness, deep pockets, etc. At the operation 1240, exemplary top feature aspects common in the recall set may include: "color," "soft," and "wash well." The top feature aspects may be sent to operation 1250 for feature aspect selection.

At operation 1250, at least one feature aspect is selected from the top feature aspects for the user 1202. The selection is personalized based on the user aspect affinity data of the user 1202. Then at operation 1260, a final recommendation may be determined, where the final recommendation includes personalized recommended items and a personalized title for the personalized recommended items. The personalized title may be generated to describe the selected at least one feature aspect. The personalized recommended items may be generated as a subset of the recall set of items, based on the selected at least one feature aspect. The personalized recommended items may be ranked based on: their distances to the anchor item in the heterogeneous graph, and/or their relatedness to the selected at least one feature aspect. The distances may be L2 distances in an embedding space. The relatedness of each recommended item may be measured based on a frequency that the selected at least one feature aspect is mentioned in user reviews of the recommended item. In some embodiments, the final recommendation may be provided to the user 1202, e.g. in response to the recommendation request.

In some embodiments, the inference operations in the process 1200 in FIG. 12 may be performed more frequently than the model training process 800 in FIG. 8. For example, the inference operations (for same user and same anchor item) in the process 1200 may be performed every 2 weeks, while the model training process 800 may be performed every month.

FIG. 13 illustrates exemplary results of feature aspect selection for different users, in accordance with some embodiments of the present teaching. As discussed above, the feature aspect selection is personalized based on user aspect affinity data of each user. Even if a same anchor item is interacted with by different users, the final recommended items to these users may be different at least because the users have different user aspect affinity data. In the example shown in FIG. 13, a same bedsheet item was interacted by three different users 1310, 1320, 1330. Using the same bedsheet item as an anchor item, K nearest neighbor items for the anchor bedsheet item can be determined based on a heterogeneous graph, as discussed above. Then top feature aspects common to the K nearest neighbor items can be determined. For example, as the K nearest neighbor items are most likely also bedsheets, exemplary top feature aspects common to these K nearest neighbor items may include: "color," "soft," and "wash well."

But the three different users 1310, 1320, 1330 may have different user aspect affinity data. That is, their most affinitive aspects among the top feature aspects may be different. In the example shown in FIG. 13, the user 1310 has most affinity to "color" among the top feature aspects "color," "soft," and "wash well." In contrast, the user 1320 has most affinity to "soft" among the top feature aspects; while the user 1330 has most affinity to "wash well" among the top feature aspects. As such, a personalized carousel 1312 provided to the user 1310 includes recommended bedsheets related to and/or ranked based on the "color" aspect; a personalized carousel 1322 provided to the user 1320 includes recommended bedsheets related to and/or ranked based on the "soft" aspect; and a personalized carousel 1332 provided to the user 1330 includes recommended bedsheets related to and/or ranked based on the "wash well" aspect. Accordingly, a recommendation title 1314 describes the recommended bedsheets in the personalized carousel 1312 as similar items where customers "love the color;" a recommendation title 1324 describes the recommended bedsheets in the personalized carousel 1322 as similar items that "are soft;" and a recommendation title 1334 describes the recommended bedsheets in the personalized carousel 1332 as similar items that "wash well." That is, the recommendation title is also dynamic based on the users and their respective affinity models.

Therefore, both the recommended items and the recommendation title displayed to a user are personalized for the user. In addition, the ranking of the recommended items may also be personalized based on the selected aspect, which is determined based on the user's most affinity.

FIG. 14 is a flowchart illustrating an exemplary method 1400 for providing personalized item recommendations with personalized title, in accordance with some embodiments of the present teaching. In some embodiments, the method 1400 can be carried out by one or more computing devices, such as the item recommendation computing device 102 and/or the cloud-based engine 121 of FIG. 1. Beginning at operation 1402, a trained model is generated based on user interaction data with respect to a website. At operation 1404, each user of the website is represented as an embedding in a heterogeneous graph based on the trained model. At operation 1406, each item offered on the website is represented as an embedding in the heterogeneous graph based on the trained model. An anchor item is determined at operation 1408 to be displayed to a user. The anchor item is represented at operation 1410 as an anchor embedding in the heterogeneous graph based on the trained model. A set of items is determined at operation 1412 based on the anchor embedding in the heterogeneous graph.

At operation 1414, a set of feature aspects is determined, each of the feature aspects characterizing a respective aspect of features common to the set of items. At least one feature aspect is selected at operation 1416 from the set of feature aspects based on at least one implicit intent of the user. At operation 1418, a ranked list of items is generated from the set of items as recommended items based on the at least one feature aspect. At operation 1420, a recommendation title describing the at least one feature aspect is generated for the recommended items. At operation 1422, the recommended items and the recommendation title are transmitted to be displayed together with the anchor item to the user.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
a processor; and
a non-transitory memory storing instructions that, when executed, cause the processor to:
determine a set of items based on an anchor item to be displayed to a user,
determine a set of feature aspects each characterizing a respective aspect of features shared by the set of items, select at least one feature aspect from the set of feature aspects,
generate, from the set of items, a ranked list of recommended items based on the at least one feature aspect,
generate a trained machine learning model based on historical recommendation data,
execute the trained machine learning model to generate, for the ranked list of recommended items, a recommendation list title describing the at least one feature aspect shared by the ranked list of recommended items,
re-train the trained machine learning model based on the recommendation list title, wherein the re-training updates parameters of the trained machine learning model,
store the parameters of the re-trained machine learning model in a database, and
transmit the ranked list of recommended items and the recommendation list title to be displayed together with the anchor item to the user.

2. The system of claim 1, wherein:
the anchor item is determined based on an interaction of the user with a website.

3. The system of claim 1, wherein the at least one processor is configured to:
represent each user of a website as a user embedding in a heterogeneous graph based on the trained machine learning model;
represent each item offered on the website as an item embedding in the heterogeneous graph based on the trained machine learning model; and
build, for each respective item having a respective item embedding in the heterogeneous graph, at least one nearest neighbor index indicating at least one nearest neighbor item whose item embedding is closest to the respective item embedding.

4. The system of claim 3, wherein the set of items is determined based on:
representing the anchor item as an anchor embedding in the heterogeneous graph based on the trained machine learning model;
searching in the heterogeneous graph, based on the anchor embedding, to identify K nearest neighbor items for the anchor item, wherein K is a predetermined positive integer; and
determining the set of items based on the K nearest neighbor items.

5. The system of claim 4, wherein the set of feature aspects is determined based on:
obtaining user aspect affinity data for the user, wherein the user aspect affinity data is obtained based on at least one item that is either interacted with by the user or nearest to a user embedding of the user in the heterogeneous graph; and
determining the set of feature aspects based on the user aspect affinity data and the set of items, wherein the set of feature aspects are top feature aspects shared by the set of items.

6. The system of claim 5, wherein the at least one feature aspect is selected from the top feature aspects based on at least one implicit intent of the user and the user aspect affinity data.

7. The system of claim 6, wherein:
the recommended items are ranked based on at least one of: their distances to the anchor item in the heterogeneous graph, or their relatedness's to the at least one feature aspect; and a relatedness of each recommended item to the at least one feature aspect is measured based on a frequency that the at least one feature aspect is mentioned in user reviews of the recommended item.

8. The system of claim 3, wherein the trained machine learning model is trained based on:

positive and negative samples that are generated based on historical user transaction data and expert inputs;

user item affinity data indicating which user prefers which item based on historical user interaction data with respect to the website; and item aspect relation data including feature aspects frequently mentioned in user reviews and/or item descriptions for each item.

9. The system of claim 1, further comprising:

execute the re-trained machine learning model to generate, for a second ranked list of recommended items, a second recommendation list title describing at least one feature aspect shared by the second ranked list of recommended items, and transmit the second ranked list of recommended items and the second recommendation list title for display.

10. A computer-implemented method, comprising:

determining a set of items based on an anchor item to be displayed to a user;

determining a set of feature aspects each characterizing a respective aspect of features shared by the set of items;

selecting at least one feature aspect from the set of feature aspects;

generating, from the set of items, a ranked list of recommended items based on the at least one feature aspect;

generating a trained machine learning model based on historical recommendation data;

executing the trained machine learning model to generate, for the ranked list of recommended items, a recommendation list title describing the at least one feature aspect shared by the ranked list of recommended items; and re-training the trained machine learning model based on the recommendation list title, wherein the re-training updates parameters of the trained machine learning model, storing the parameters of the re-trained machine learning model in a database, transmitting the ranked list of recommended items and the recommendation list title to be displayed together with the anchor item to the user.

11. The computer-implemented method of claim 10, further comprising:

representing each user of a website as a user embedding in a heterogeneous graph based on the trained machine learning model;

representing each item offered on the website as an item embedding in the heterogeneous graph based on the trained machine learning model; and building, for each respective item having a respective item embedding in the heterogeneous graph, at least one nearest neighbor index indicating at least one nearest neighbor item whose item embedding is closest to the respective item embedding.

12. The computer-implemented method of claim 11, wherein determining the set of items comprises:

representing the anchor item as an anchor embedding in the heterogeneous graph based on the trained machine learning model;

searching in the heterogeneous graph, based on the anchor embedding, to identify K nearest neighbor items for the anchor item, wherein K is a predetermined positive integer; and determining the set of items based on the K nearest neighbor items.

13. The computer-implemented method of claim 12, wherein determining the set of feature aspects comprises:

obtaining user aspect affinity data for the user, wherein the user aspect affinity data is obtained based on at least one item that is either interacted with by the user or nearest to a user embedding of the user in the heterogeneous graph; and determining the set of feature aspects based on the user aspect affinity data and the set of items, wherein the set of feature aspects are top feature aspects shared by the set of items.

14. The computer-implemented method of claim 13, wherein the at least one feature aspect is selected from the top feature aspects based on at least one implicit intent of the user and the user aspect affinity data.

15. The computer-implemented method of claim 14, wherein:

the recommended items are ranked based on at least one of: their distances to the anchor item in the heterogeneous graph, or their relatedness's to the at least one feature aspect; and a relatedness of each recommended item to the at least one feature aspect is measured based on a frequency that the at least one feature aspect is mentioned in user reviews of the recommended item.

16. The computer-implemented method of claim 11, wherein the trained machine learning model is trained based on:

positive and negative samples that are generated based on historical user transaction data and expert inputs;

user item affinity data indicating which user prefers which item based on historical user interaction data with respect to the website; and item aspect relation data including feature aspects frequently mentioned in user reviews and/or item descriptions for each item.

17. A non-transitory computer readable medium having instructions stored thereon, wherein the instructions, when executed by at least one processor, cause at least one device to perform operations comprising:

determining a set of items based on an anchor item to be displayed to a user;

determining a set of feature aspects each characterizing a respective aspect of features shared by the set of items;

selecting at least one feature aspect from the set of feature aspects;

generating, from the set of items, a ranked list of recommended items based on the at least one feature aspect;

generating a trained machine learning model based on historical recommendation data;

executing the trained machine learning model to generate, for the ranked list of recommended items, a recommendation list title describing the at least one feature aspect shared by the ranked list of recommended items; and re-training the trained machine learning model based on the recommendation list title, wherein the re-training updates parameters of the trained machine learning model, storing the parameters of the re-trained machine learning model in a database, transmitting the ranked list of recommended items and the recommendation list title to be displayed together with the anchor item to the user.

18. The non-transitory computer readable medium of claim 17, wherein the instructions, when executed by the at least one processor, further cause the at least one device to perform operations comprising:

representing each user of a website as a user embedding in a heterogeneous graph based on the trained machine learning model, wherein the anchor item is determined based on an interaction of the user with the website;

representing each item offered on the website as an item embedding in the heterogeneous graph based on the trained machine learning model; and building, for each respective item having a respective item embedding in the heterogeneous graph, at least one nearest neighbor index indicating at least one nearest neighbor item whose item embedding is closest to the respective item embedding.

19. The non-transitory computer readable medium of claim 18, wherein determining the set of items comprises:

representing the anchor item as an anchor embedding in the heterogeneous graph based on the trained machine learning model;

searching in the heterogeneous graph, based on the anchor embedding, to identify K nearest neighbor items for the anchor item, wherein K is a predetermined positive integer; and determining the set of items based on the K nearest neighbor items.

20. The non-transitory computer readable medium of claim 19, wherein determining the set of feature aspects comprises:

obtaining user aspect affinity data for the user, wherein the user aspect affinity data is obtained based on at least one item that is either interacted with by the user or nearest to a user embedding of the user in the heterogeneous graph; and determining the set of feature aspects based on the user aspect affinity data and the set of items, wherein the set of feature aspects are top feature aspects shared by the set of items, wherein:

the at least one feature aspect is selected from the top feature aspects based on at least one implicit intent of the user and the user aspect affinity data, the recommended items are ranked based on at least one of: their distances to the anchor item in the heterogeneous graph, or their relatedness's to the at least one feature aspect, and a relatedness of each recommended item to the at least one feature aspect is measured based on a frequency that the at least one feature aspect is mentioned in user reviews of the recommended item.

* * * * *